US009317959B2

(12) United States Patent
Densham

(10) Patent No.: US 9,317,959 B2
(45) Date of Patent: Apr. 19, 2016

(54) SYSTEM AND METHOD FOR VISUALIZING VIRTUAL OBJECTS ON A MOBILE DEVICE

(71) Applicant: CAST Group of Companies Inc., Toronto (CA)

(72) Inventor: Gilray Densham, Inglewood (CA)

(73) Assignee: CAST Group of Companies Inc., Toronto (CA)

( * ) Notice: Subject to any disclaimer, the term of this patent is extended or adjusted under 35 U.S.C. 154(b) by 255 days.

(21) Appl. No.: 14/193,617

(22) Filed: Feb. 28, 2014

(65) Prior Publication Data

US 2014/0176537 A1  Jun. 26, 2014

Related U.S. Application Data

(63) Continuation of application No. 13/040,202, filed on Mar. 3, 2011, now Pat. No. 8,683,387.

(60) Provisional application No. 61/310,148, filed on Mar. 3, 2010.

(51) Int. Cl.
G06F 3/0484 (2013.01)
G06T 15/00 (2011.01)
G06F 3/048 (2013.01)
H04N 13/02 (2006.01)

(52) U.S. Cl.
CPC ............... *G06T 15/00* (2013.01); *G06F 3/048* (2013.01); *H04N 13/02* (2013.01)

(58) Field of Classification Search
CPC .................................................. G06F 3/0484
USPC ............................................................ 715/849
See application file for complete search history.

(56) References Cited

U.S. PATENT DOCUMENTS

| 6,337,710 | B1* | 1/2002 | Watkins | G11B 27/034 340/2.1 |
| 6,727,925 | B1* | 4/2004 | Bourdelais | G06T 19/00 715/850 |
| 6,756,998 | B1* | 6/2004 | Bilger | H04L 12/2803 715/734 |
| 7,144,367 | B2 | 12/2006 | Chen et al. | |
| 7,277,572 | B2* | 10/2007 | MacInnes | G06F 17/5004 345/419 |
| 7,640,041 | B2* | 12/2009 | Ragan | H04M 1/72522 360/137 |
| 8,010,906 | B1* | 8/2011 | Sinnard | G06Q 10/06 715/243 |
| 8,363,113 | B2* | 1/2013 | Kim | G06F 17/30047 348/207.1 |
| 2002/0065635 | A1* | 5/2002 | Lei | G06T 19/00 703/1 |

(Continued)

OTHER PUBLICATIONS

Li, Qiang; "Virtual Reality for Fixture Design and Assembly"; Thesis submitted to the University of Nottingham for the degree of Doctor of Philosophy; Oct. 2008; Online at http://etheses.nottingham.ac.uk/650/1/BillyThesisFinal.pdf.

*Primary Examiner* — Reza Nabi
(74) *Attorney, Agent, or Firm* — Blake, Cassels & Graydon LLP; Wilfred P. So

(57) ABSTRACT

A system and a method are provided for visualizing virtual objects on a mobile device. A computing device is in communication with the mobile device. The computing device generates a 3D virtual world of one or more virtual objects corresponding to one or more physical objects in a real world. The computing device then associates information with the one or more virtual objects and generates one or more static images based on the 3D virtual world. The mobile device receives the one or more static images and the associated information associated from the computing device, and then displays the one or more static images.

12 Claims, 21 Drawing Sheets

(56) References Cited

U.S. PATENT DOCUMENTS

| | | | | |
|---|---|---|---|---|
| 2004/0041999 A1* | 3/2004 | Hogan | G06T 7/0044 | 356/141.5 |
| 2004/0105573 A1* | 6/2004 | Neumann | G06T 17/00 | 382/103 |
| 2005/0081161 A1* | 4/2005 | MacInnes | G06F 17/5004 | 715/765 |
| 2006/0111878 A1* | 5/2006 | Pendyala | G06F 17/5004 | 703/1 |
| 2008/0018667 A1* | 1/2008 | Cheng | A63F 13/10 | 345/632 |
| 2009/0013263 A1* | 1/2009 | Fortnow | G06Q 10/10 | 715/753 |
| 2010/0066750 A1* | 3/2010 | Yu | H04L 67/38 | 345/581 |
| 2010/0073363 A1* | 3/2010 | Densham | G05B 17/02 | 345/419 |
| 2010/0149347 A1* | 6/2010 | Kim | G06F 17/30047 | 348/207.1 |
| 2010/0313146 A1* | 12/2010 | Nielsen | G06T 19/006 | 715/757 |
| 2011/0055746 A1* | 3/2011 | Mantovani | B63C 11/26 | 715/771 |
| 2011/0164116 A1* | 7/2011 | Gay | G06T 19/006 | 348/47 |
| 2011/0216090 A1* | 9/2011 | Woo | G06K 9/00 | 345/633 |
| 2012/0050535 A1* | 3/2012 | Densham | H04N 5/2224 | 348/159 |
| 2013/0128054 A1* | 5/2013 | Densham | H04N 5/23296 | 348/169 |
| 2013/0135303 A1* | 5/2013 | Densham | G06T 17/00 | 345/420 |
| 2014/0176537 A1* | 6/2014 | Densham | G06F 3/048 | 345/419 |

\* cited by examiner

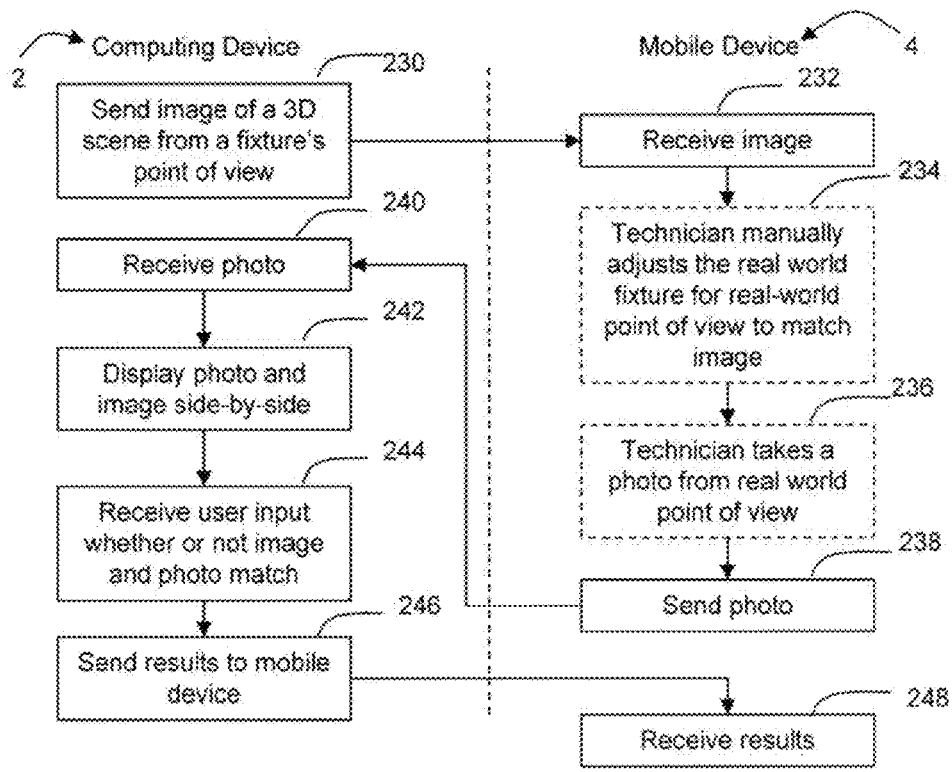

Adjust position and orientation of mobile device

SYSTEM AND METHOD FOR VISUALIZING VIRTUAL OBJECTS ON A MOBILE DEVICE

This application is a Continuation of U.S. application Ser. No. 13/040,202 filed on Mar. 3, 2011, which claims priority from U.S. Application No. 61/310,148 filed on Mar. 3, 2010, the contents of which are incorporated herein by reference.

TECHNICAL FIELD

The following relates generally to visualizing virtual objects on a mobile device.

DESCRIPTION OF THE RELATED ART

The positioning, orientation, and general setup of an object, such as a fixture, in a physical environment may be planned or designed before setting up the object in the physical environment, or the real world. For example, in the entertainment industry, the information to set up a lighting fixture for a concert venue may be predetermined. An environment designer may determine where objects are to be placed in the physical environment. However, the environment designer may desire another person, such as a technician, to set up or physically place the objects in the physical environment. Since there may be a large amount of setup information, which is varied and complex, the environment designer and the technician often work together in the physical environment to set up the objects. It is recognized that collaboration of the environment designer and the technician in the same physical environment can be time consuming.

SUMMARY

A system and a method are provided for visualizing virtual objects on a mobile device. A computing device is in communication with the mobile device. The computing device generates a 3D virtual world of one or more virtual objects corresponding to one or more physical objects in a real world. The computing device then associates information with the one or more virtual objects and generates one or more images based on the 3D virtual world. The mobile device receives the one or more images and the associated information associated from the computing device, and then displays the one or more images.

The mobile device is also configured to display the one or more images, and then receive a selection input associated with the one or more virtual objects to invoke the display of the information associated with the one or more virtual objects. The one or more images may comprise any one of a plot image, a look image, a 3D rendered image of the 3D virtual world or an image from a virtual fixture's point of view, or many more types of images. If the virtual object is a virtual fixture, then the mobile device is also configured to receive a selection input associated with the virtual fixture to invoke the display of an image of the 3D virtual world from the selected virtual fixture's point of view.

The computing device is also configured to, upon receiving a name of a virtual fixture from the mobile device, obtain an image from the point of view of the named virtual fixture. The computing device then sends the image from the point of view of the named virtual fixture to the mobile device.

In another aspect, the computing device, upon receiving a location of the mobile device, determines a location of a virtual fixture located closest to the location of the mobile device in 3D virtual word. The computing device then obtains an image from the point of view of the closest virtual fixture, and then sends the image from the point of view of the closest virtual fixture to the mobile device.

In another aspect, the computing device, upon receiving a location and a orientation of the mobile device, identifies a corresponding location and a corresponding orientation in the 3D virtual world. It then obtains an image of the 3D virtual world from a point of view from the corresponding location and the corresponding orientation. The computing device then sends the image of the 3D virtual world to the mobile device.

In another aspect in which the one or more images is an image from a point of view of a virtual fixture, the computing device, upon receiving a photograph from the mobile device, displays in a graphical user interface (GUI) the photograph and the image from the point of view of the virtual fixture. The computing device then receives through the GUI a user input that determines a result indicating whether or not the photograph matches the image from the point of view of the virtual fixture. It then sends the result to the mobile device.

In another aspect in which the one or more images is an image from a point of view of a virtual fixture, and the mobile device comprises a camera, the mobile device, upon receiving the image from the point of view of the virtual fixture, displays the received image overlaid an image viewed by the camera. This acts as a reference or guide to help a user take a photograph that matches the received image. Upon the mobile device receiving an input to capture the image viewed by the camera, the mobile device saves the image viewed by the camera as a photograph.

In another aspect, it can be appreciated that the one or more images can be an image from a point of view of a virtual fixture, and the virtual fixture is any one of a camera and a light.

BRIEF DESCRIPTION OF THE DRAWINGS

Embodiments will now be described by way of example only with reference to the appended drawings wherein:

FIG. 17 is a screen-shot of an example GUI for comparing a fixture-point-of-view image and a fixture-point-of-view photograph.

FIG. 18 is a flow diagram of example computer executable operations for comparing a fixture-point-of-view image and a fixture-point-of-view photograph.

DETAILED DESCRIPTION

Figure 1:
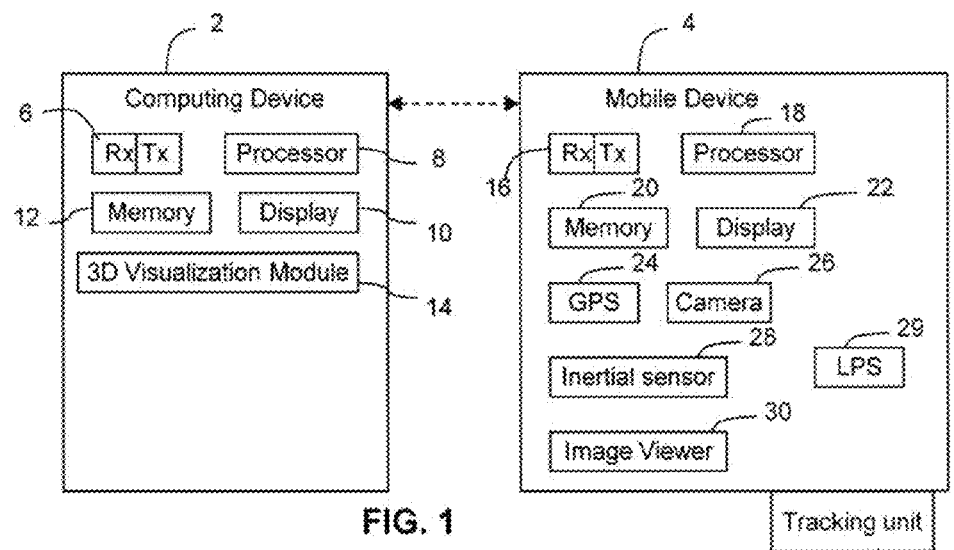
FIG. 1 is a system diagram illustrating an example configuration of a computing device and a mobile device.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

By way of background, an environment designer determines where to set-up objects in a physical environment. The environment designer may consider a number of factors, such as for example, the position of the object, the orientation of the object, and the operating parameters of the object, if the object is operable. In the context of the lighting industry, for example, a lighting designer may design a physical environment to include a number of lighting fixtures that each have desired positions, orientations, and operating parameters (e.g. color, brightness, pattern, pan and tilt, etc.). In another example, in the event planning industry (e.g. weddings, corporate events, ceremonies, etc.), an event planner designs a room to include seating and table arrangements. In another example, an interior designer or architect designs a room to include lighting, furniture, flooring, walls, curtains, etc.

It is appreciated that although many of the below examples are in the context of lighting, the principles described herein are applicable to other objects and environments.

An environment designer may design the physical environment in a three-dimensional (3D) virtual world that corresponds to or matches with the physical world. In other words, the virtual objects in the virtual world correspond to the physical objects in the physical world. The size and spatial relationship between the virtual objects typically correspond to the size and spatial relationship between the physical objects.

The design of the 3D virtual world is implemented using software on a computing device. The rendering of the 3D images, the database of virtual objects and their relationships to one another, and the rules or algorithms to generate a 3D virtual world, typically require large amounts of computing resources. In other words, usually a computing device that is able to generate the 3D virtual world may also be physically large and inconvenient for a user to carry around.

In one example, a designer and a technician, not necessarily in the lighting industry, collaborate in the same physical environment to set-up the objects. For example, a lighting designer and a lighting technician may meet in a concert hall to set up lighting fixtures. The lighting designer will use the computing device that has generated the 3D virtual world to instruct the lighting technician regarding the placement and operation of the lighting fixtures. Based on such instructions, the lighting technician may move to the location of the fixtures to manually set-up or adjust the fixtures. However, in this method, both the designer and the technician are in the same physical location. Further, if the technician is dependent on the visualization of the computing device and the instructions of the designer, the technician may have to move back and forth between the fixtures and the computing device.

It can also be appreciated that the information used by the a technician is different from the information used by a designer. For example, a designer may be interested in the final setup as well as how the physical environment may look after the fixtures and objects have finally been set up. The technician may be interested in the details of how to manually set up the fixtures and objects in the physical space. The communication of the different types of information, as well as coordinating the intentions and efforts between a designer and a technician may be difficult.

In another example, an event designer desires to show a customer how a room can look like when set up with chairs, tables, podiums, lights, etc. Typically, the event designer will use a computing device to generate a 3D visual representation of the room which specifies the placement and selection of chairs, tables, podiums, lights, etc., and then uses the computing device to generate a picture of the 3D visual representation. The customer then looks at the picture to understand how the room will look. However, the customer may have difficulty relating how a picture of the 3D visual representation relates to the actual, physical room in terms of size, location, and perspective.

To address these difficulties, the following systems and methods for visualizing objects (e.g. fixtures) on a mobile device are provided.

In FIG. 1, a computing device 2 and a mobile device 4 are in communication with one another. The computing device 6 includes a receiver and a transmitter, or transceiver 6, a processor 8, memory 12, a display 10, and a 3D visualization module 14. The 3D visualization module 14 can include computer executable instructions and data for managing and generating a 3D virtual world.

The mobile device 4 includes a receiver and a transmitter, or a transceiver 16, which is able to communicate with the receiver and transmitter, or transceiver 6, of the computing device 2. It can be appreciated that the mobile device 4 and the computing device 2 may communicate over a wireless network or a wired network. The mobile device 4 also includes a processor 18, memory 20, a display 22, GPS 24, a camera 26, an inertial sensor 28 and an image viewer 30. The inertial sensor 28 (e.g. gyroscopes, accelerometers) can be used to measure orientation of the mobile device 4. The mobile device 4 also includes a local positioning system (LPS) 29 used to determine the location or orientation, or both, of the mobile device 4 in smaller areas, such as indoor environments. Examples of LPS include the use of Wi-Fi signals, measurements from the inertial sensor 28, RFID signal triangulation, etc. The image viewer 30 may include computer executable instructions and data for viewing object or fixture information sent from the computing device 2.

The mobile device 4 may also be associated with a tracking device 5. The tracking device 5 may cooperate with a tracking system to provide the position coordinates (e.g. 3 dimensions) and the orientation (e.g. roll, pitch, yaw) of the mobile device 4. This location information can be sent to the computing device 2 to track the location of the mobile device 4. An example of such a tracking device and a tracking system are provided in U.S. patent application Ser. No. 12/872,956, the contents of which are herein incorporated by reference in its entirety. Such an example embodiment of the tracking system and tracking device is commercially available under the trade-mark BlackTrax by CAST Group of Companies Inc.

The above configurations for the computing device 2 and the mobile device 4 are for example, and there may be various other configurations for the computing device 2 and the mobile device 4 that are applicable to principles described herein.

Figure 2:
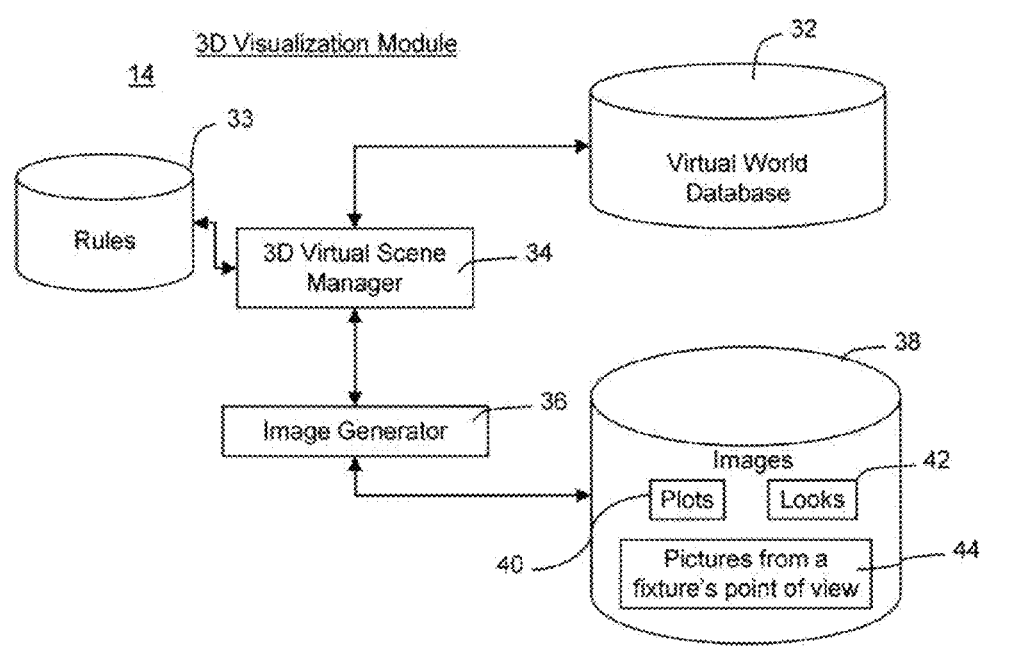
FIG. 2 is a block diagram showing an example configuration of a 3D visualization module.

Turning to FIG. 2, an example configuration of the 3D visualization module 14 is provided. A virtual world database 32 includes data related to virtual objects, whereby the virtual objects correspond to real-world objects. A 3D virtual scene manager 34 is in communication with the virtual world database 32. The 3D virtual scene manager 34 may receive user inputs to arrange virtual objects in a virtual world, as well to determine operational parameters associated with the virtual objects. The 3D virtual scene manager 34 may also be in communication with a rules database 33, which may include rules for determining how the virtual objects interact with one another in the virtual world, as well as how the virtual objects operate or function. It can also be appreciated that the 3D virtual scene manager 34 generates 3D renderings of the virtual world. A non-limiting example of a 3D virtual scene manager 34 is WYSIWYG™ by CAST Group of Companies Inc., which may render a number attributes (e.g. LEDs, LED Flares, time-of-day capability in shaded view for virtually real environmental conditions, beam color-mixing, lens flares, beam colour temperature, the real distance light travels, footprint qualities of the beams with new footprints, accurate shadows, animated smoke, geometry smoothing, etc.). An environment designer may interact with the 3D virtual scene manager 34 to design, or pre-visualize, the 3D virtual world. Such a design process may include the selection and placement of virtual objects in the 3D virtual world.

Figure 3:
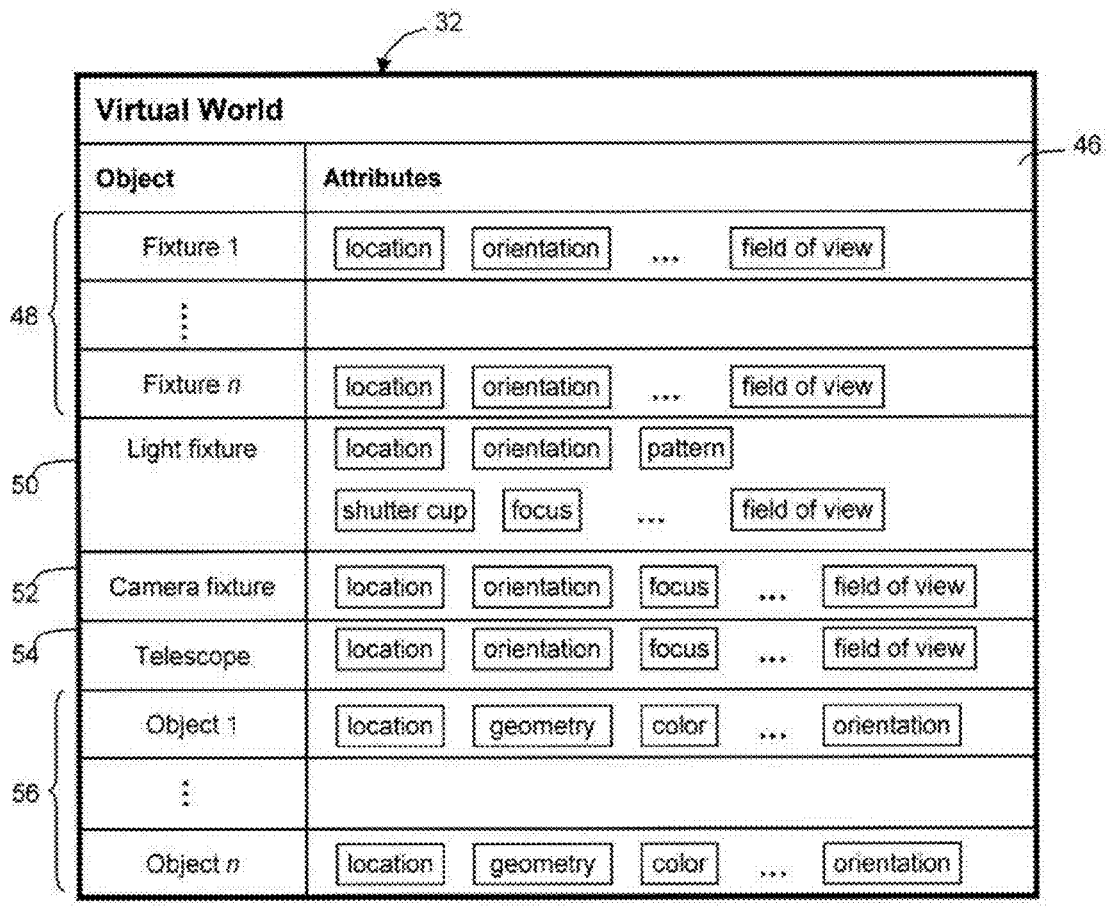
FIG. 3 is a block diagram showing an example configuration of data in a virtual world database.

Turning to FIG. 3, an example configuration for a virtual world database 32 is provided. The virtual world database 32 comprises a number of virtual objects, whereby each virtual object may be associated with one or more attributes 46. For example, the virtual world database 32 may include a number of virtual fixtures 48, whereby each virtual fixture may be associated with a location, orientation and field of view. A particular example of a fixture may include a light fixture 50, which may be associated with a light pattern, a shutter cut (e.g. mechanical beam shaping), and focusing attributes. Other examples of virtual fixtures include a camera fixture 52 and a telescope fixture 54. The virtual objects may include any type of object 56. Other example attributes associated with the objects may include geometry, size, color, weight, material, power draw, etc. As described above, the virtual objects correspond with the real-world objects. Therefore, other attributes (e.g. physical and functional attributes) of a real-world object may be characterized and associated with the corresponding virtual object. In this way, the virtual object may better represent the corresponding real-world object.

Turning back to FIG. 2, also in communication with the 3D virtual scene manager 36, is an image generator 36. The 3D virtual scene manager 34 and the image generator 36 exchange visualization information that allows the image generator 36 to generate various types images based on the 3D virtual world. The images are stored in an images database 38.

The images produced by the image generator 36 may be in a different format from the visual renderings of the 3D virtual scene manager 34. In particular, the visual renderings from the 3D virtual scene manager 34 may include many different types of spatial data, operational data, rendering data, shadow data, texture data, etc. The visual renderings from the 3D virtual scene manager 34 may also have user interface controls and algorithms for creating 3D visual renderings of a 3D virtual world from almost all perspectives. It can be readily understood that the process of producing such visual renderings may be data intensive and may consume a great amount of computing resources.

By contrast, the images produced by the image generator 36 may contain much less data. For example, the images may be static images of the visual renderings produced by the 3D virtual scene manager 34. The images may be perceived to be static since the images may not contain all the 3D spatial data used to generate the 3D visual renderings. An example of a static image is a photograph. By contrast, the 3D virtual scene manager 34 may communicate with the virtual world database 32 to obtain the spatial data to generate a visual rendering, such a 3D visual rendering, of the 3D virtual world. Non-limiting example static image formats may include Joint Photographic Experts Group (JPEG), JPEG File Interchange Format (JFIF), Portable Networks Graphic (PNG), Portable Document Format (PDF), Bitmap (BMP), Tagged Image File Format (TIFF), Graphics Interchange Format (GIF), Portable Any Map (PNM), Portable Pixmap (PPM), and Portable Bitmap (PBM). The image or file format may also be specific to the 3D visualization module 14.

Examples of the types of images generated by the image generator 36 include plots 40, looks 42, and pictures or images from a fixture's point of view 44. A plot 40 may be a 2D representation of the 3D virtual world. The plot 40 may be a line or wire drawing which, for example, may be similar to an architect's blue print. A "look" 42 may include a static 3D rendering of a perspective of the 3D virtual world at a certain state. For example, the 3D virtual world, in one state, may include one or more activated fixtures. A look, or a static 3D rendering of the 3D virtual world in that state may be generated. In the example context of the lighting industry, certain combinations of light fixtures are activated to create a first look, while a different combination of light fixtures are activated a second look. An image from a fixture's point of view 44 may include an image of the 3D virtual world from the point of view of the selected fixture. In other words, if a person were in the position of a fixture looking in the direction of the fixture's lens, for example, the person may be able to see a scene of the real-world, that corresponds to the fixture's point of view of the 3D virtual world.

Figure 4:
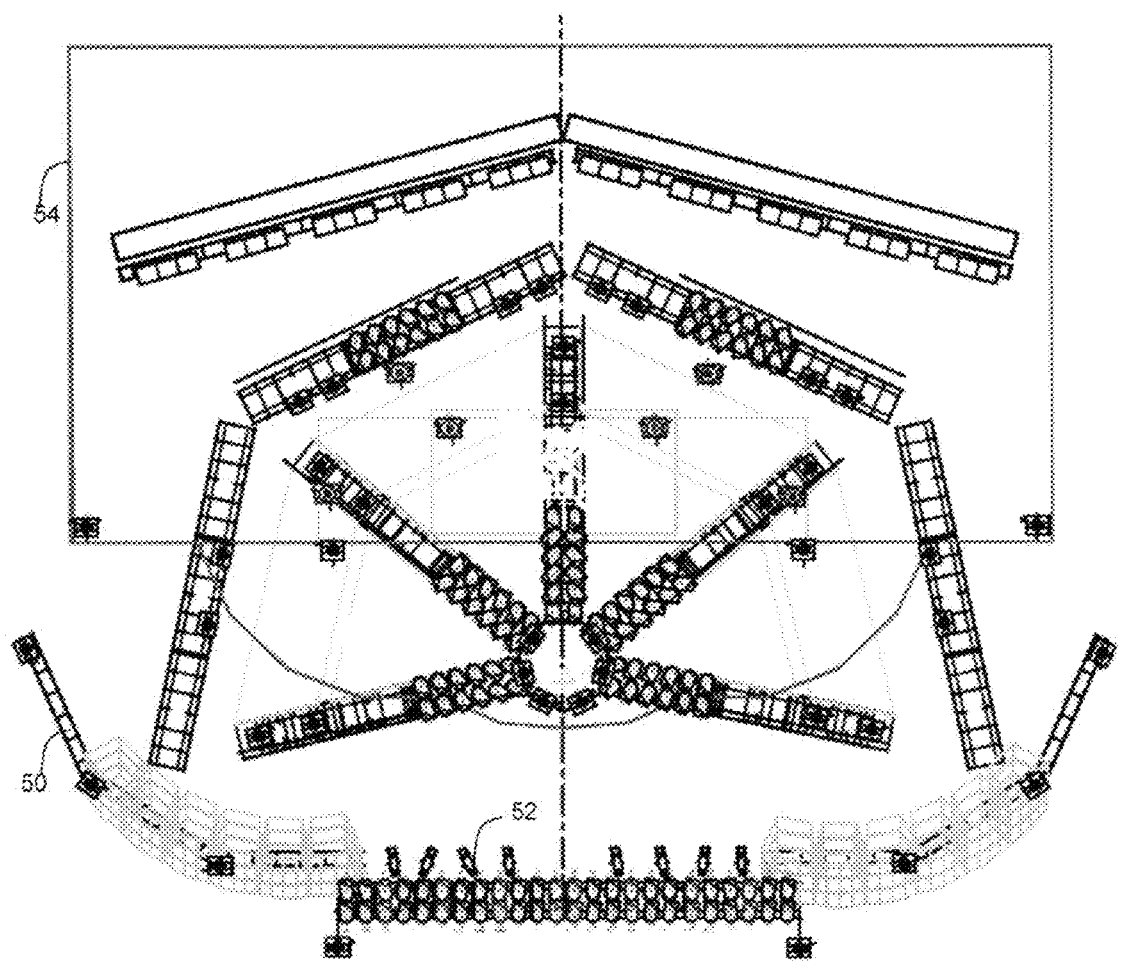
FIG. 4 is an example of a plot image.

FIG. 4 shows an example plot 48 of a stage 54, a number of lights 52, and a number of trusses 50 from a plan view. From the plot 48, the arrangement of the stage 54, the light fixtures 52 and the trusses 50 that support the light fixtures 50 can be seen. It can be appreciated that other perspectives (e.g. elevation view, perspective view, etc.) are applicable to the principles described herein.

Figure 5:
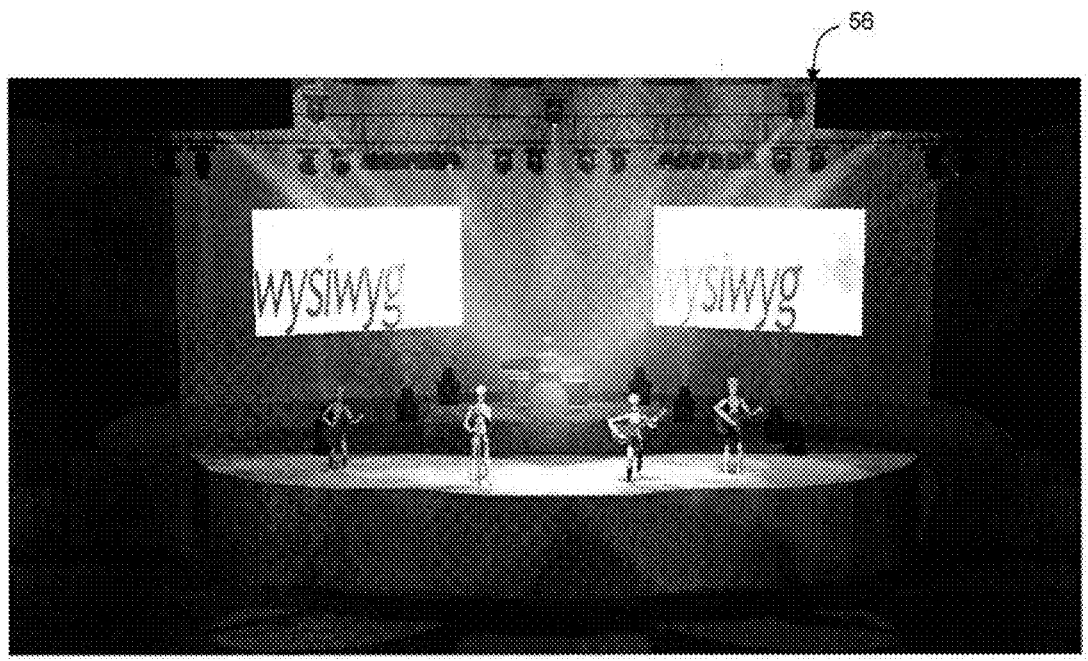
FIG. 5 is an example of a look image.

FIG. 5 shows an example look 56 of a stage, lights, and performers of a music band. From the example look 56, it can be seen which of the virtual light fixtures are activated, as well as how the real-world environment may look like if the real-world light fixtures corresponding to the virtual light fixtures are activated.

Figure 6:
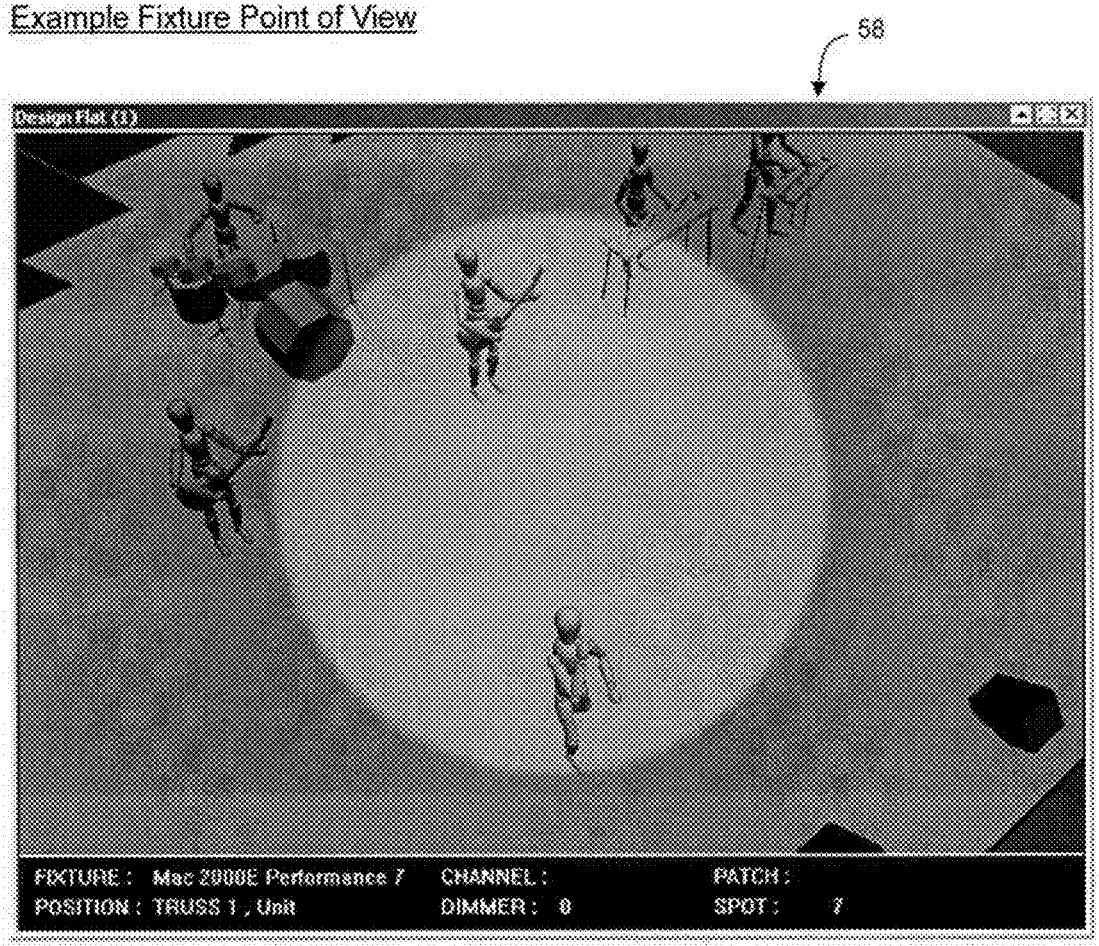
FIG. 6 is an example of an image of a 3D virtual world from the point of view of a virtual fixture.

FIG. 6 shows an example image of the 3D virtual world from a fixture's point of view 58. In the example, the fixture is a light fixture that produces a circular-shaped light on the stage. From the example image 58, it can be seen where the edge of the circular-shaped light should be positioned relative to other objects or persons on the stage.

It will be appreciated that any application or module exemplified herein may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data, except transitory propagating signals per se. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 4 or the computing device 2, or both, or accessible or connectable thereto. Any application or module herein described may be implemented using computer readable/executable instructions that may be stored or otherwise held by such computer readable media.

Figure 7:
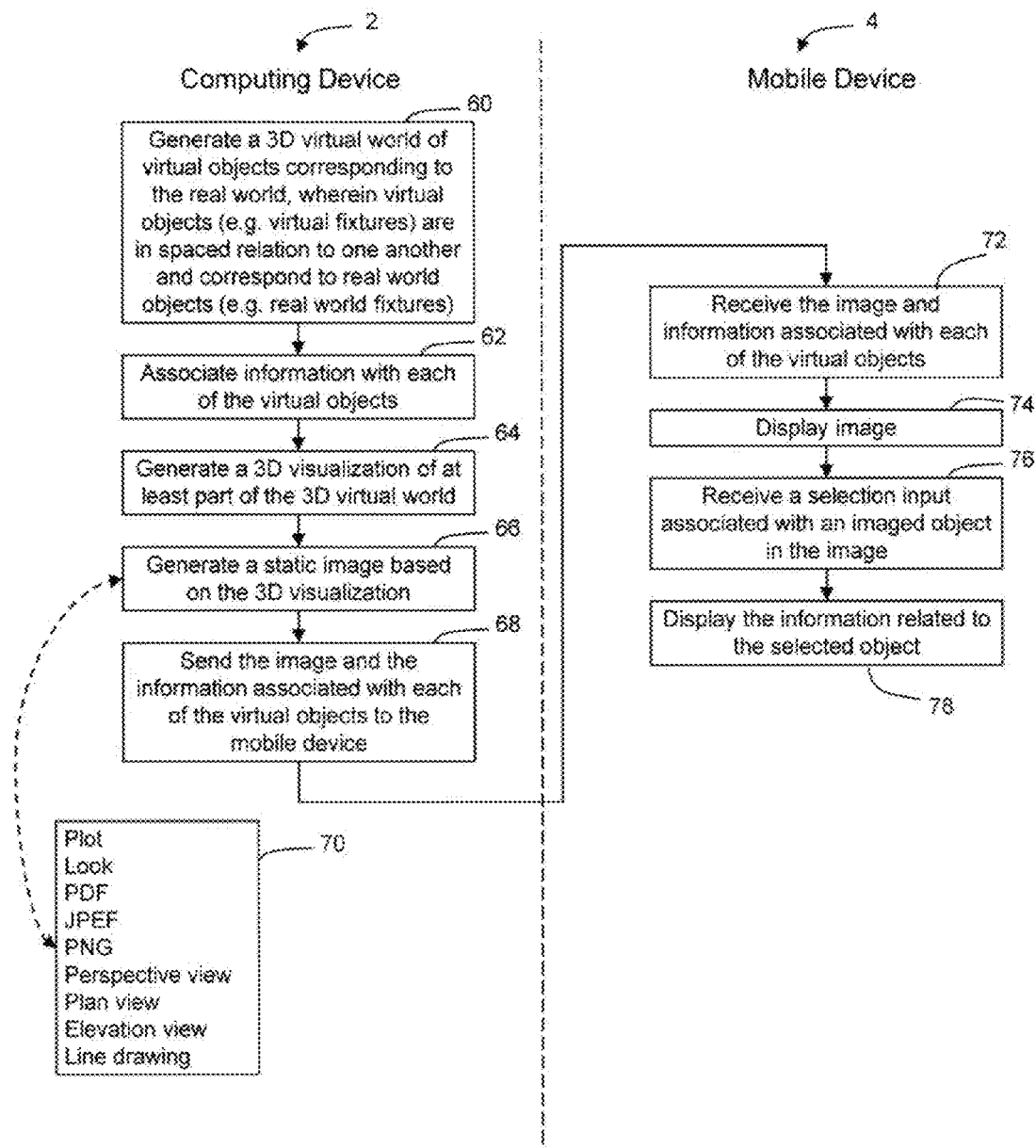
FIG. 7 is a flow diagram of example computer executable operations for generating an image on a computing device and displaying the image on a mobile device.

Turning to FIG. 7, example computer executable instructions are provided for visualizing virtual objects on a mobile device 4. At block 60, the computing device 2 generates a 3D virtual world of virtual objects corresponding to the real world, or physical world. The virtual objects (e.g. virtual fixtures) are in spaced relation to one another and may correspond to the real-world objects (e.g. real-world fixtures). In many cases, the design of the 3D virtual world is determined by an environment designer. As described above, the environment designer may interact with the 3D virtual scene manager 34 to create and design the 3D virtual world. At block 62, information is associated with each of the virtual objects. Examples of such information may include the position of the object, the orientation of the object, the type or name of the object, identification of other objects that are in connection with the object, electrical connections, data channel connections, etc. In another embodiment, some or all of such information may already be associated with the virtual objects as attributes of the virtual objects. It can be appreciated that the information associated with the object may be particularly useful to a technician who is arranging the corresponding real-world objects or setting-up the corresponding real-world objects in the real-world environment. At block 64, the computing device 2 generates a 3D visualization of at least part of the 3D virtual world. At block 66, the computing device 2 generates a static image based on the 3D visualization. As described above, the type of static images may vary, as shown in block 70. The images may be stored in the images database 38. At block 68, one or more images and the information associated with each of the virtual objects are sent to the mobile device 4. In one embodiment, only the information that is associated with virtual objects that are present in the image are sent to the mobile device 4. At block 72, the mobile device 4 receives the image or images, as well as the information associated with the virtual objects. At block 74, the mobile device 4 displays the image. For example, the image viewer 30 may display the image. At block 76, the mobile device 4 receives a selection input associated with a virtual object in the image. The selection input may be in the form of a touch on a touch screen device. The selection input may also be a click or push on a track ball, track wheel, track pad, or button device. It can be appreciated that depending on the type of input device on the mobile device 4, the form of the selection input may vary. At block 78, the mobile device 4 displays the information associated with the selected object.

Figure 8:
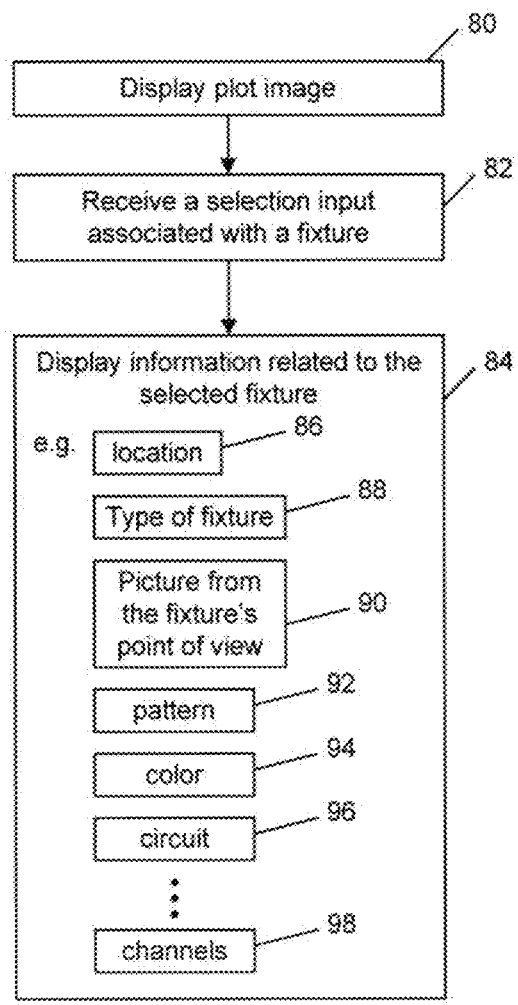
FIG. 8 is a flow diagram of example computer executable operations for displaying on a mobile device a plot image and information associated with a fixture on the plot image.

Turning to FIG. 8, example computer executable instructions for displaying a plot image on a mobile device 4 are provided. Upon receiving the plot image and the associated information from the computing device 2, at block 80, the mobile device 4 displays the plot image on the display 22. At block 82, upon receiving a selection input associated with a certain fixture present in the image, the mobile device 4 displays information related to the selected fixture (block 84). Examples of the information associated with the selected fixture include the fixture's location 86, the type of fixture 88, and an image from the fixture's point of view 90. For lighting fixtures or similar-typed fixtures, the associated information may also include the lighting pattern 92, the color of the light 94, the electrical circuit 96 connected to the fixture, as well as the data channels 98 associated with the fixture 98. As described above, it may be perceived that such information is particularly useful to a technician who is arranging the corresponding real-world fixture or setting-up the corresponding real-world fixture in the real-world environment.

Figure 9:
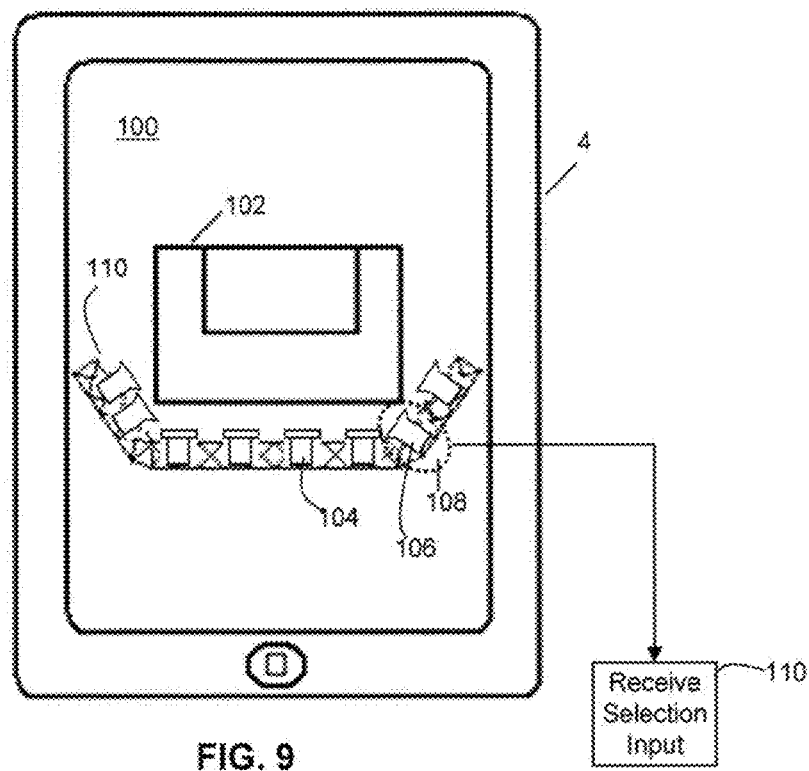
FIG. 9 is a screen-shot of an example plot image and graphical user interface (GUI).
Figure 10:
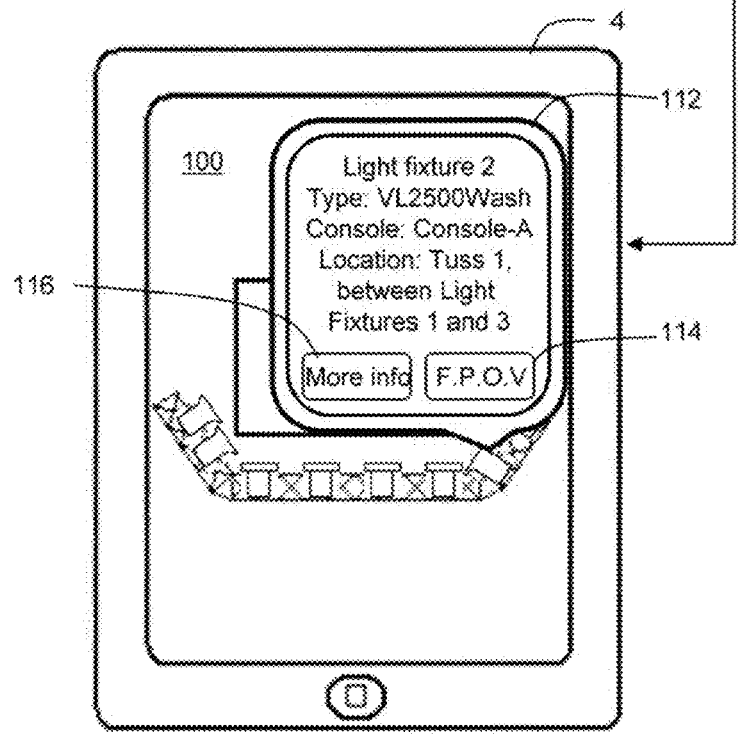
FIG. 10 is a screen-shot of the example plot image of FIG. 9, also including the display of information associated with a light fixture.

Turning to FIG. 9 and FIG. 10, example screen-shots of a plot image 100 from a plan view are provided on a mobile device 4. The plot image 100 shows a stage 102, a truss 110 and a number of light fixtures, for example light fixtures 104 and 106. Associated with each light fixture may be an activation area that, when selected with a user input, is able to generate a response. The activation area may or may not be visible to the user. For example, the light fixture 106 may have an activation area 108. The user may move a cursor over the activation area 108, or may simply touch or tap the light fixture 106 to provide an input associated with the activation area 108. When the mobile device 4 receives a selection input 110 from the user associated with the light fixture 106, the mobile device 4 displays an information display 112 which includes information associated with the light fixture 106. For example, in FIG. 10, the information display 112 names the light fixture 106 as Light Fixture 2, and that it is of the "VL2500Wash" type. The light fixture 106 may also be connected to a physical console (e.g. "Console-A"). The light fixture may be located on Truss 1, between Light Fixture 1 and Light Fixture 3. The information display 112 may include additional information. Alternatively, a "more information" button 116 may be provided to allow a user invoke the display of additional information about the light fixture 106, upon providing a selection input associated with the more information button 116. In a preferred embodiment, it can be appreciated that by selecting any one of the fixtures in the image, information regarding the selected image is displayed.

It can be appreciated that the principles described with respect to the plot image in FIG. 9 and FIG. 10 may also applicable to look-type images. For example, (not shown) the example look 56 shown in FIG. 5 may also include activation areas that allow a user to invoke the display of information associated with objects in the look image 56.

Continuing with FIG. 10, there may also be fixture's point of view button 114 that, when selected, invokes the mobile device 10 to display an image of the virtual world from the selected fixture's point of view.

Figure 11:
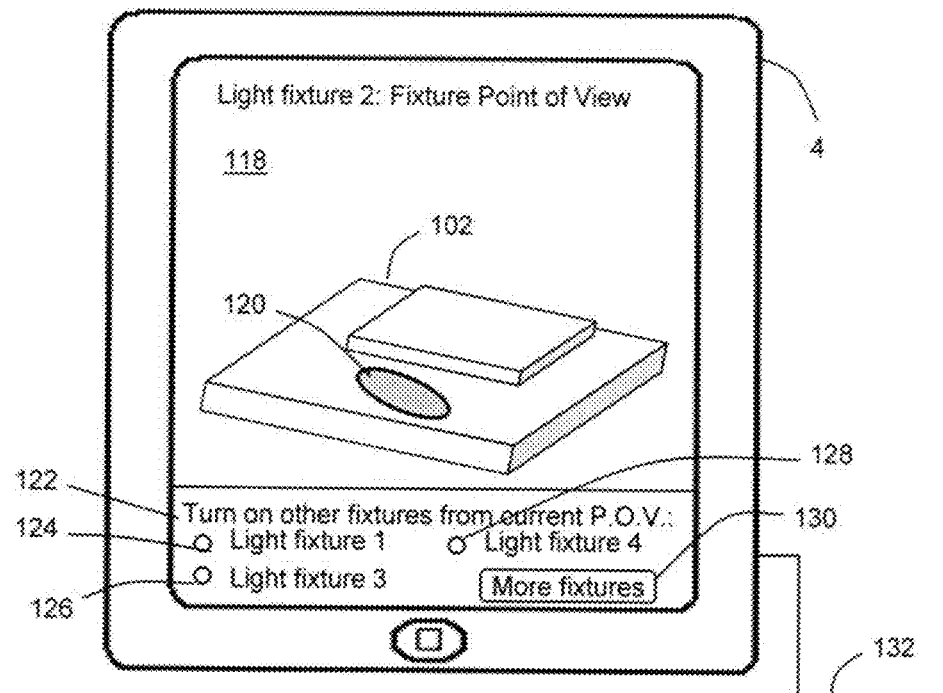
FIG. 11 is a screen-shot of an example fixture-point-of-view image.

For example, turning to FIG. 11, when button 114 is selected, the example screen-shot 118 is displayed showing the stage 102 from the point of view of light fixture 106. As seen in the example plot image 100, the light fixture 106 is positioned and oriented at an angle relative to the stage 102. In the point-of-view screen-shot 118, the relative positioning and orientation between the light fixture 106 and the stage 102 is visually represented. Furthermore, the screen-shot 118 of the fixture point-of-view image may show the spot light 120 that is produced by light fixture 106. This visual information may help a technician to orient and position the real-world light fixture corresponding to virtual Light Fixture 2 106. For example, when physically setting up Light Fixture 2, the physical stage and the location and shape of the physical beam of light cast by Light Fixture 2 as seen by the technician when looking from Light Fixture 2's point-of-view should match with the screen-shot 118.

A graphical user interface (GUI) 122 may also be provided to allow a user to invoke the display of an image that includes light beams of other light fixtures. For example, the user can provide a selection input to turn on or activate another light fixture. The light beam of the other light fixture would be displayed, from the perspective of the originally selected light fixture (e.g. light fixture 106). For example, screen shot 118 shows an image of the 3D virtual world from the point of view from Light Fixture 2 (e.g. light fixture 106). The GUI 122 provides the options to activate other light fixtures, such as Light Fixture 1 124, Light Fixture 3 126 and Light Fixture 4 128. It can be readily understood there may be controls 130 for activating other light fixtures.

Figure 12:
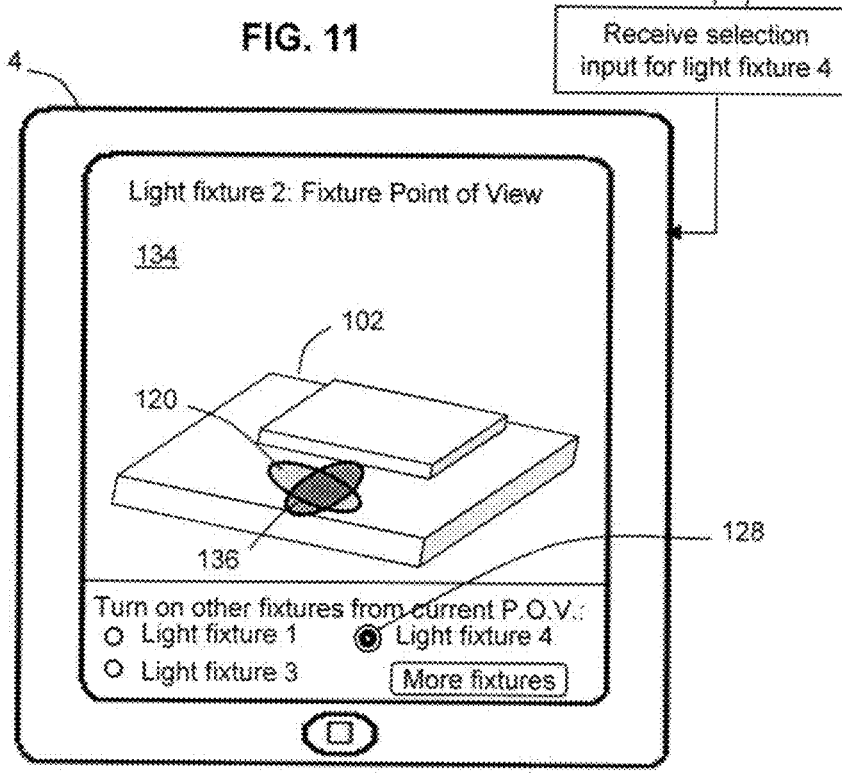
FIG. 12 is a screen-shot of another example fixture-point-of-view image.

Upon the mobile device 4 receiving a selection input 132 for activating or turning on Light Fixture 4, at FIG. 12, the light beam 136 originating from Light Fixture 4 is displayed. In this example, Light Fixture 4 corresponds with the virtual light fixture 104 numbered in FIG. 9, whereby light fixture 104 faces the stage 102 directly. Therefore, as can be seen in FIG. 12, the light beam 136 of Light Fixture 4 is shown in the screen-shot 134 at an angle to the light beam 120 of Light Fixture 2. The screen-shot 134 may remain from the perspective of Light Fixture 2 (e.g. light fixture 106).

It can be appreciated that the generation of the screen-shots 118 and 134 may take place on the computing device 2. The spatial computations and 3D renderings from the different perspectives, as well as the effect of the lighting from different light fixtures, is preferably determined or computed by the 3D visualization module 14. The static images from the different fixture perspectives, as well as variations of images, where one or more other light fixtures are activated, are generated by the image generator 36 and stored in the image database 38. The static images that are of interest to the user are sent to the mobile device 4, and are displayed according to the user's selection inputs. As described above, the static images may contain less data and do not require rendering since it is an image based on a rendered visualization (e.g. a 3D rendered visualization) of the 3D virtual world. Therefore, the computing resources used to display the static images on the mobile device 4 are greatly reduced, compared to the computing resources used to generate 3D rendering to the 3D virtual world.

Figure 13:
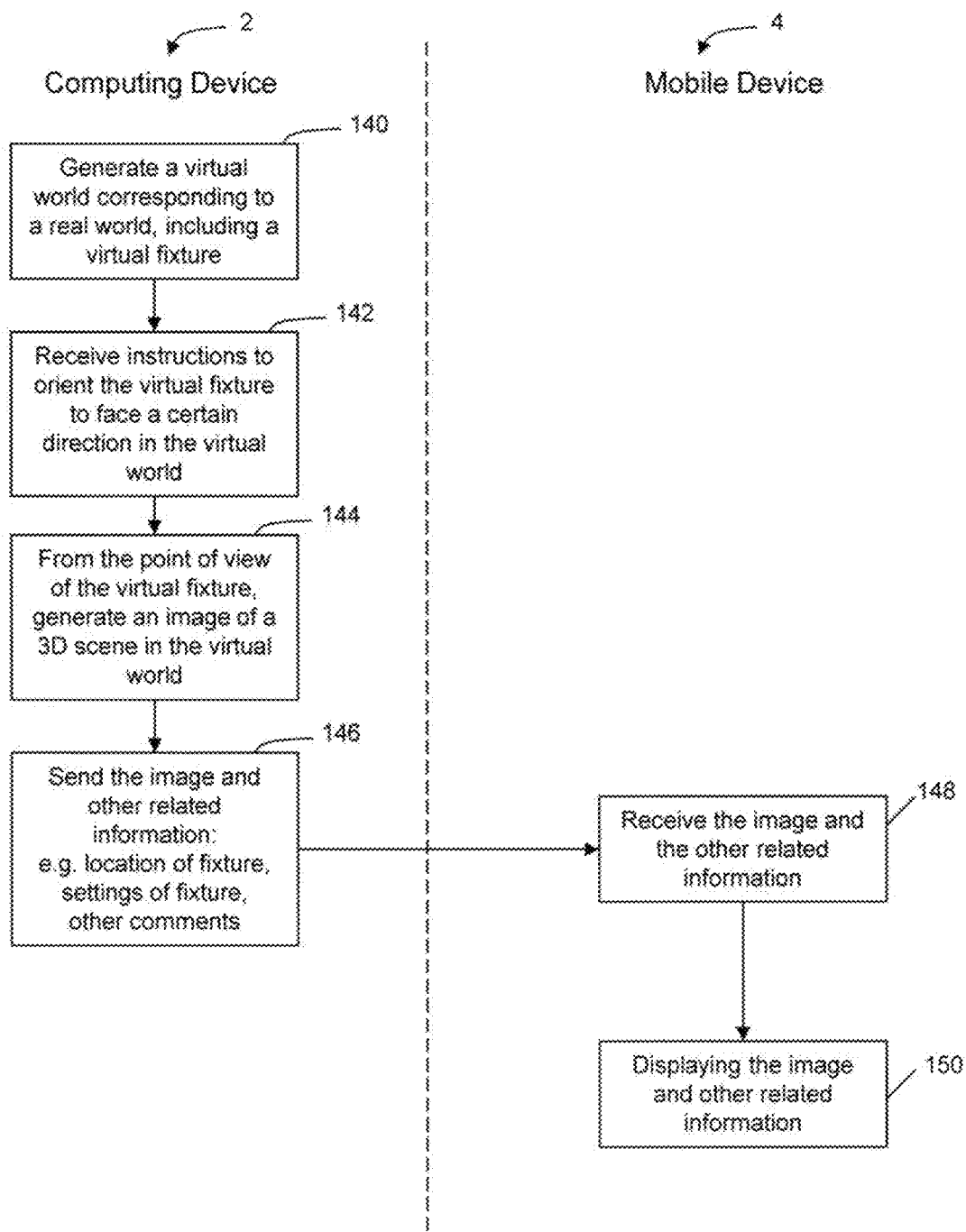
FIG. 13 is a flow diagram of example computer executable operations for generating a fixture-point-of-view image on a computing device and displaying the image on a mobile device.

Turning to FIG. 13, example computer executable instructions for displaying an image from a fixture's point of view are provided. At block 140, the computing device 2 generates a virtual world corresponding to a real world, whereby the virtual world includes a virtual fixture. At block 142, the computing device 2 may receive instructions or inputs from a user to orient the virtual fixture to face a certain direction in the virtual world. Alternatively, or in combination, the instructions or user inputs may be related to the position of the fixture, or the functional parameters of the fixture. At block 144, the computing device 2 generates a picture or a static image of the 3D scene in the virtual world from the point of view of the virtual fixture. At block 146, the image of the 3D scene, as well as other related information (e.g. location of fixture, setting of fixture, comments from the designer, etc.) are sent to the mobile device 4. At block 148, the mobile device 4 receives the image of the 3D scene as well as the related information. The image and the other related information may be then be displayed on the mobile device 4 (block 150).

Figure 14:
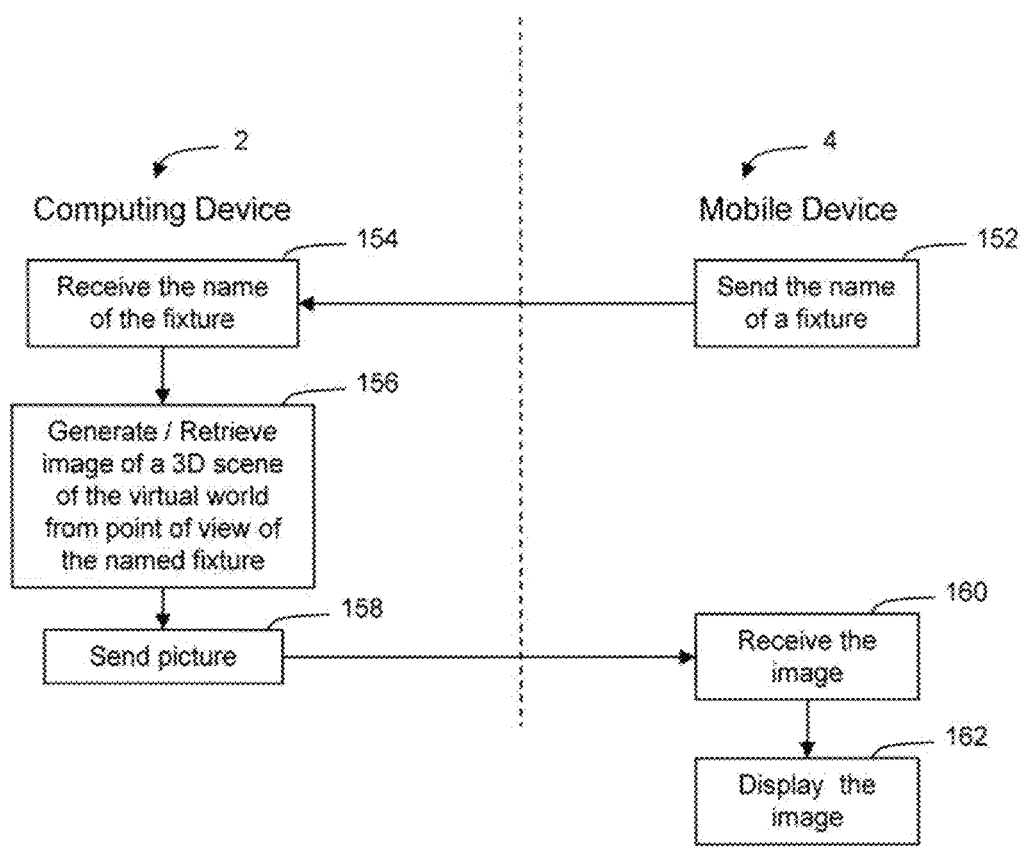
FIG. 14 is a flow diagram of example computer executable operations for generating or retrieving a fixture-point-of-view image on a computing device based on a fixture's name provided by a mobile device.

Turning to FIG. 14, example computer executable instructions for requesting and displaying an image from a fixture's point of view are provided. At block 152, the mobile device 4 sends the name of a fixture to the computing device 2. It can be appreciated that the name of the fixture may be manually entered into the mobile device 4. At block 154, the computing device 2 receives the name of the fixture, and at block 156, the computing device 2 generates the image of a 3D scene of the 3D virtual world from the point of view of the named fixture. Alternatively, at block 156, the image may already have been generated and stored in the images database 38, thereby allowing the computing device 2 to retrieve the stored image. At block 158, the computing device 2 sends the image of the 3D virtual world, as seen from the named fixture's point of view, to the mobile device 4. The mobile device 4 receives the image (block 160) and then displays the image (block 162).

Figure 15:
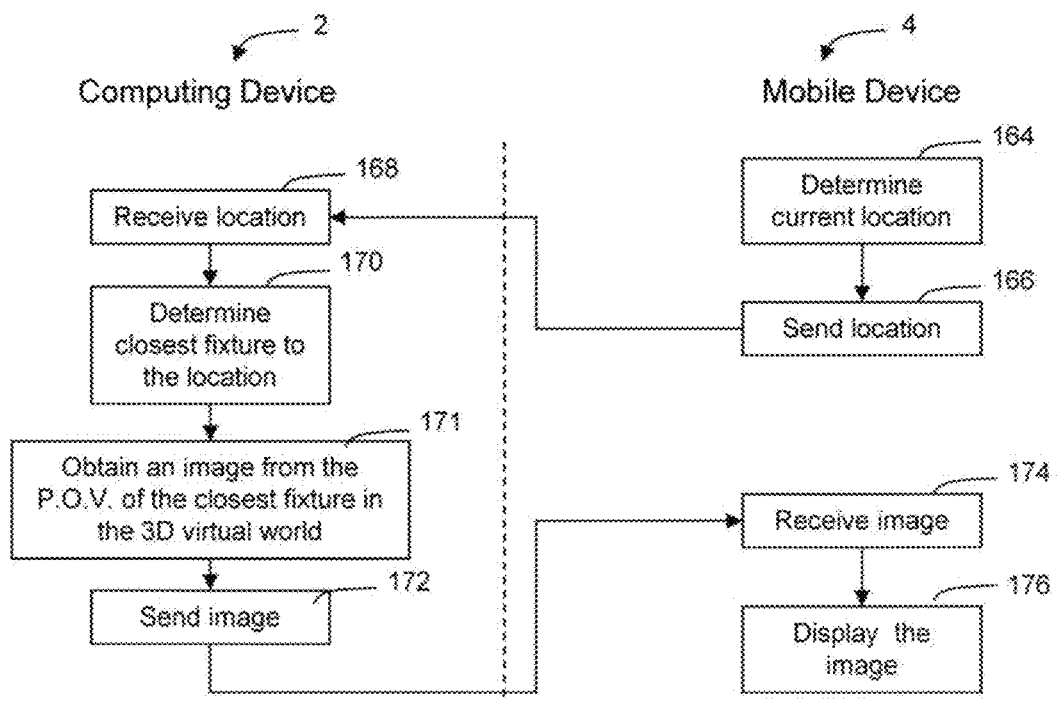
FIG. 15 is a flow diagram of example computer executable operations for generating or retrieving a fixture-point-of-view image on a computing device based on a mobile device's location.

Turning to FIG. 15, example computer executable instructions are provided for retrieving an image of a 3D virtual world from the point of view of a fixture, based on the location of the mobile device 4. At block 164, the mobile device 4 determines its current location using, for example, the GPS sensor 24 or a manual input from the user. It can be appreciated that the location of the mobile device 4 may be determined using any number of methods. The location of the mobile device 4 is then sent to the computing device 2 (block 166). Upon receiving the location of the mobile device 4

(block 168), the computing device 2 determines the closest fixture to the location of the mobile device 4 using the 3D virtual world (block 170). In one example method, the location of the mobile device 4 is represented in the 3D virtual world. The physical mobile device 4 may be symbolized as a virtual mobile device in the virtual world database 32, which may be associated with a location attribute. In other words, the location of the virtual mobile device corresponds with the physical location of the physical mobile device 4. The 3D virtual scene manager 34 then identifies the virtual fixture that is located closest to the virtual mobile device, whereby the virtual fixture corresponds with a real-world fixture. The computing device 2 then generates or retrieves an image of the 3D virtual world from the point of view of the closest virtual fixture (block 171). At block 172, the computing device 2 sends the image to the mobile device 4. Upon receiving the image (block 174), the mobile device 4 displays the image of the 3D virtual world, whereby the image is from the point of view of the closest fixture to the mobile device 4. In this way, when a technician wishes to view a scene of the environment from the point of view of a nearby fixture, the computing device 2 may conveniently locate the closest fixture and provide the image to the mobile device 4. Therefore, the technician does not need to manually locate the closest fixture, or identify the name of the fixture that is closest to the mobile device 4.

Figure 16:
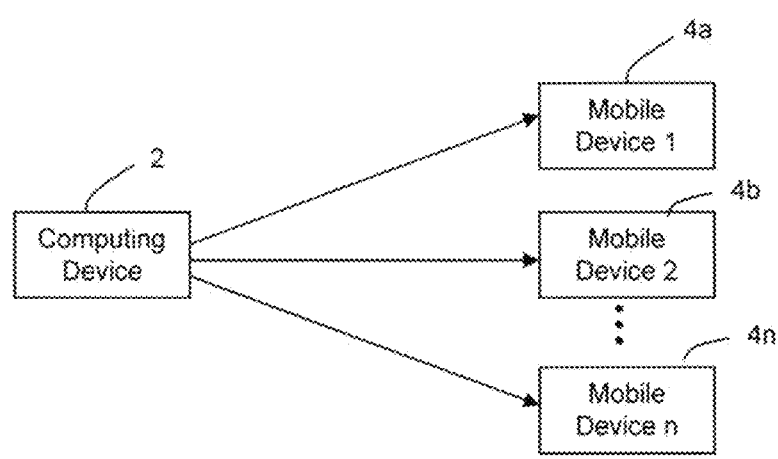
FIG. 16 is a system diagram illustrating an example configuration of a computing device and multiple mobile devices.

Turning to FIG. 16, the computing device 2 may be in communication with multiple mobile devices 4a, 4b, 4n. Such a configuration may be useful, for example, when multiple technicians are working together to set up or arrange a physical environment that has been designed by a designer and each technician has a mobile device. The 3D virtual world, which represents the real world or the physical environment, may be perceived as a design plan that is used by the technicians to set up the physical environment to match or correspond with the 3D virtual world.

In the task of arranging or setting up a real-world fixture, so that the point of view from the real-world fixture corresponds with the image of the point of view from the virtual fixture, a person (e.g. a technician or a designer) may wish to compare or confirm whether the point of views from the real-world fixture and the virtual fixture match one another. It can be appreciated that a technician may use the above principles to set up multiple real-world fixtures. The mobile device 4 may include a camera device 26. A technician can take or capture photographs using the camera device 26 of the real-world environment from the point of view of the real-world fixture. The photographs may then be compared with the static images from the virtual fixture's point of view.

Turning to FIG. 17, an example GUI 180 is provided for comparing a photograph of a real-world from the point of view of a real-world fixture and a static image of a 3D virtual world from the point of view of a virtual fixture, whereby the virtual fixture corresponds to the real-world fixture. The GUI 180 may be displayed on either the computing device 2 or on the mobile device 4.

The GUI may display the name of the fixture 182, the static image of the 3D virtual world from the perspective of the virtual fixture 184, the photograph of the real-world or physical environment from the real-world fixture's point of view 186, an overlay of the photograph over the image, or an overlay of the image over the photograph, as well as a confirmation indicator 190 to indicate whether the real-world fixture is perceived to have been adjusted to match the position, orientation, and operational settings of the virtual world fixture.

For example, a first light fixture 192 shines a spot light on a stage with curtains, as seen in the image 194 of the 3D virtual world from the virtual first light fixture's point of view. A photograph 196 shown from the real-world first light fixture's point of view is displayed next to the image 184. An overlay 198 of the photograph 196 over the image 184 allows a user (e.g. a technician or a designer) to conveniently and easily identify that the point of view of the real-world first light fixture matches the point of view of the virtual first light fixture. Therefore, the user may provide an input to positively indicate 200 that the real-world fixture is properly adjusted according to the designer's plans shown in the 3D virtual world.

In another example, a second light fixture 202 shines a spot light on a corner of a wall, as seen in image 204. A photograph 206 of the real-world from the point of view of the real-world second light fixture is unavailable, as marked by "N/A". Thus, the overlay 208 is also unavailable.

In another example, an nth light fixture 210 shines a spot light on a wall, in which a section of the beam is blocked out. This is seen in the image 212 of the 3D virtual world from the perspective of the nth virtual light fixture. A photograph 214 of the real-world or the physical environment as seen from the point of view of the real-world nth light fixture is also displayed. The overlay 216 of the image 212 over the photograph 214, or of the photograph 214 over the image 212, allows a user to determine the differences. In particular, in this example, although the position of the real-world nth light fixture matches the position of the virtual nth light fixture, the pattern of the real-world light fixture does not match the pattern of virtual light fixture. Therefore, a user may decide to indicate 218 that the real-world light fixture has not been adjusted to match the designed virtual light fixture.

It can be appreciated that either the designer at the computing device 2 or the technician at the mobile device 4 may view the GUI 180 as well as interact with the GUI 180. Furthermore, it can be appreciated that the GUI 180 is for example only, and that other user controls and configurations of the information are also applicable to the principles described herein.

Turning to FIG. 18, example computer executable instructions are provided for comparing an image generated by the computing device 2 and a photograph captured by the mobile device 4. At block 230, the computing device 2 sends an image of a 3D scene, from the virtual fixture's point of view, to the mobile device 2. Upon receiving the image on the mobile device 4 (block 232), the technician refers to the image to manually adjust the real-world fixture so that the real-world point of view matches the image (block 234). The manual adjustment may include positioning, orienting and adjusting the operational parameters of the real-world fixture. At block 236, the technician takes a photograph from the real-world fixture's point of view. At block 238, the photograph is sent to the computing device 2. Upon receiving the photograph (block 240), the computing device 2 displays the photograph and the image, for example, side-by-side or overlaid over one another, or both (block 242). The computing device 2 then receives a user input regarding whether or not the image and the photograph match (block 244), before sending the results to the mobile device 4 (block 246). The mobile device 4 then receives the results (block 248). It can be appreciated that blocks 242 and 244 may take place on the mobile device 4, in alternative or in addition to the method shown in FIG. 18.

Figure 19:
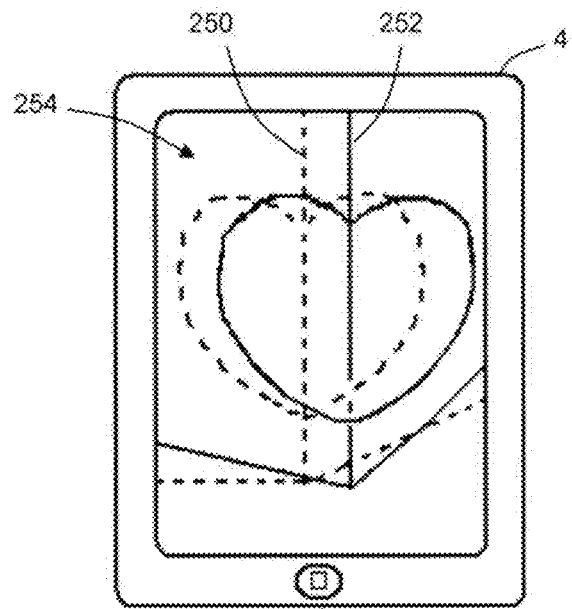
FIG. 19 is a screen-shot of an example guidance image from a fixture's point of view displayed in overlay with a camera image.
Figure 20:
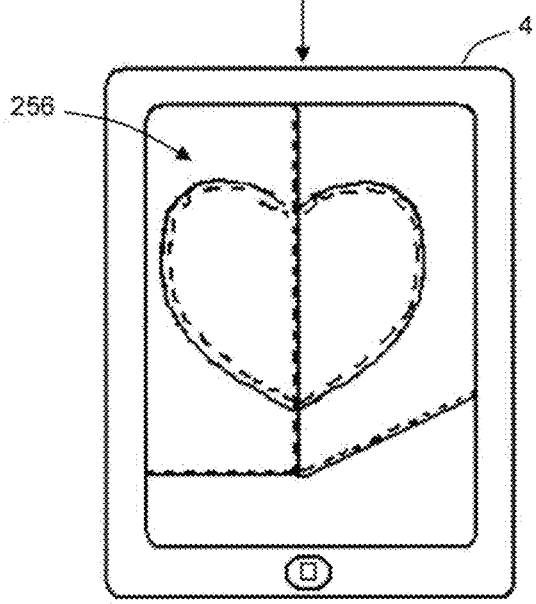
FIG. 20 is a screen-shot of the example guidance image of FIG. 19, displayed in overlay with another camera image.

Turning to FIG. 19 and FIG. 20, example screen-shots 254 and 256 are provided showing the overlay of a camera image over an image generated by the image generator 36 on the computing device 2. In order to aid the technician in taking a photograph from the point of view of the real-world fixture, a dotted image, translucent image, faded image, or lighter image 250 of the 3D virtual world from the point of view of the virtual fixture is displayed. The dotted image, translucent image, faded image, or lighter image 250 (herein referred to as a "guidance image" 250) is static on the mobile device's display 22. The photographic image 252 as seen from the camera's view is laid over top the guidance image 250, or vice versa. In the screen-shot 254, the point of view of the camera 26 is different from the point of view of the virtual fixture and, thus, the lines of the photographic image 252 do not align with the lines of the guidance image 250. Thus, the technician manually adjusts the position and orientation of the camera 26 (e.g. the mobile device 4) with the aim for the photographic image 252 to align with the guidance image 250. In FIG. 20, the screen-shot 256 shows the images 252 and 250 aligned with one another. When the images 252 and 250 are aligned, the technician may desire to activate the camera's shutter to capture a photograph of the real-world or physical environment from the point of view of the real-world fixture. In this way, a user (e.g. a technician or a designer) may more easily compare and determine whether the arrangement or setup of a real-world fixture matches the arrangement or setup of the virtual fixture, as designed or planned in the 3D virtual world.

Figure 21:
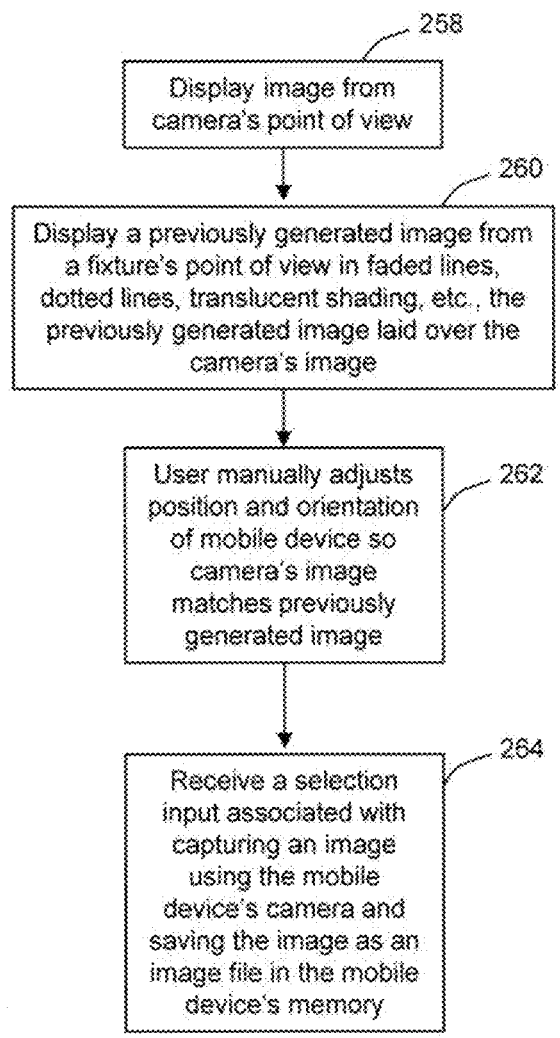
FIG. 21 is a flow diagram of example computer executable operations for generating or retrieving a fixture-point-of-view image on a computing device based on a mobile device's location.

Turning to FIG. 21, example computer executable instructions and user steps are provided for capturing a photograph from the point of view of a real-world fixture. At block 258, the mobile device 4 displays an image from a camera's point of view. At block 260, the mobile device 4 displays a guidance image over top the camera image. It can be appreciated that, in the alternative, the camera image may also be displayed over top the guidance image. At block 262, the user manually adjusts the position and orientation of the camera 26 or mobile device 4 in order for the camera's image to match the guidance image. At block 264, the mobile device 4 receives a selection input associated with capturing the camera's image an image file or a photograph, which is stored in the mobile device's memory 20.

In another aspect, the above principles can be used to provide an augmented reality experience to an environment designer or a customer. A user, such as the environment designer or the designer's customer, is able to walk around in a physical room with a mobile device 4. The location and orientation of the mobile device 4 are tracked and are used to determine a corresponding location and orientation in the 3D virtual world. A 3D rendered image of the virtual from the perspective of the corresponding location and orientation is generated and shown on the mobile device 4. The 3D rendered image includes other virtual features that are in addition to the physical room, thereby augmenting what the user actually sees in physical room. In this way, a user can compare an image of a 3D visualization of a "designed" room with the actual physical room. These principles are discussed further with respect to FIG. 22 and FIG. 23.

Figure 22:
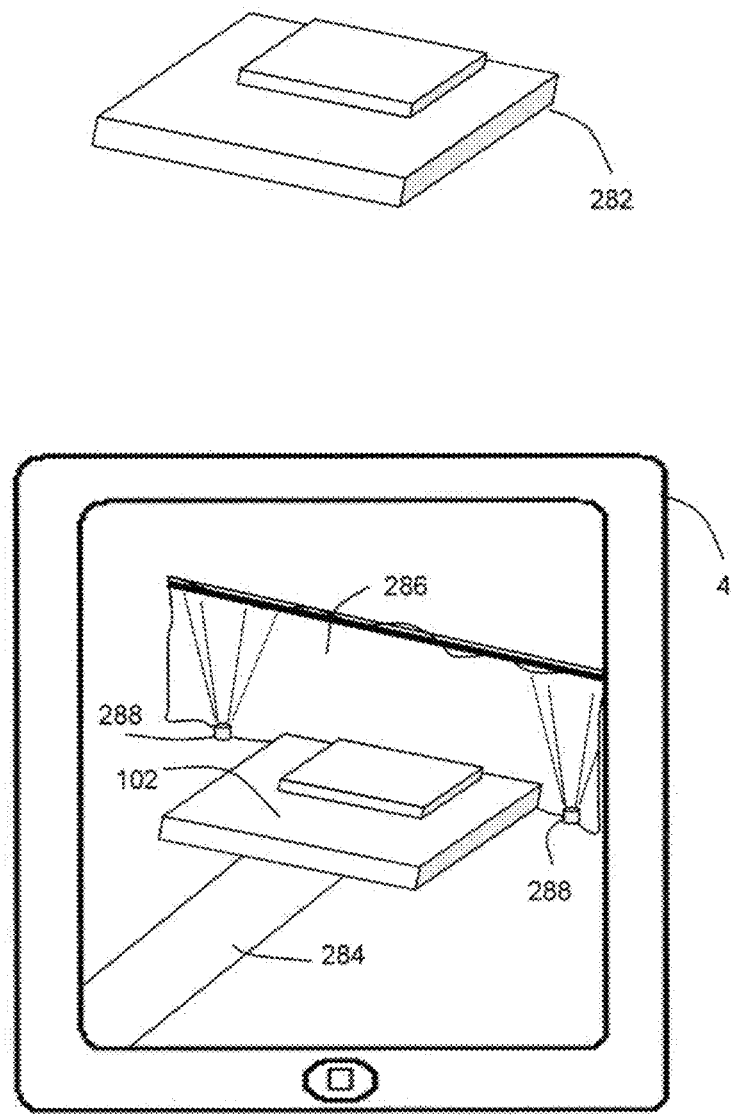
FIG. 22 is a system diagram illustrating the mobile device displaying an augmented image generated from a 3D virtual world corresponding to the physical environment of the mobile device.

Turning to FIG. 22, the physical environment includes a stage 282 (e.g. for presenters) and the mobile device 4. The mobile device 4 is located in front of the stage 282 and oriented to face the stage 282. An environment designer or event planner has created a 3D virtual world corresponding to the physical environment, which includes a virtual stage 102 corresponding to the physical stage 282. The environment designer has also added other objects to 3D virtual world, including a curtain back-drop 286, lighting 288 shining against the back-drop 286, and a carpet 284 extending to front of the stage 102.

Continuing with FIG. 22, the mobile device 4 displays a 3D rendered image of the 3D virtual environment from a location and orientation that corresponds to the physical location and orientation of the mobile device 4. Thus, the mobile device 4 displays a 3D rendered image of the virtual stage 102 from the same perspective as the mobile device 4 is oriented towards the physical stage 282. The image displayed on the mobile device 4 also includes the lighting 288, back-drop 286 and carpet 284. In other words, although a carpet, lighting, and back-drop are not present in the physical world, the specification and placement of these objects can be visualized on the mobile device 4. The environment designer, or their customer, is then able to simultaneously view the physical world (e.g. physical stage 282) and the envisioned "designed" environment on the mobile device 4 from similar perspectives. This provides more clarity in the layout of the physical environment's design.

Figure 23:
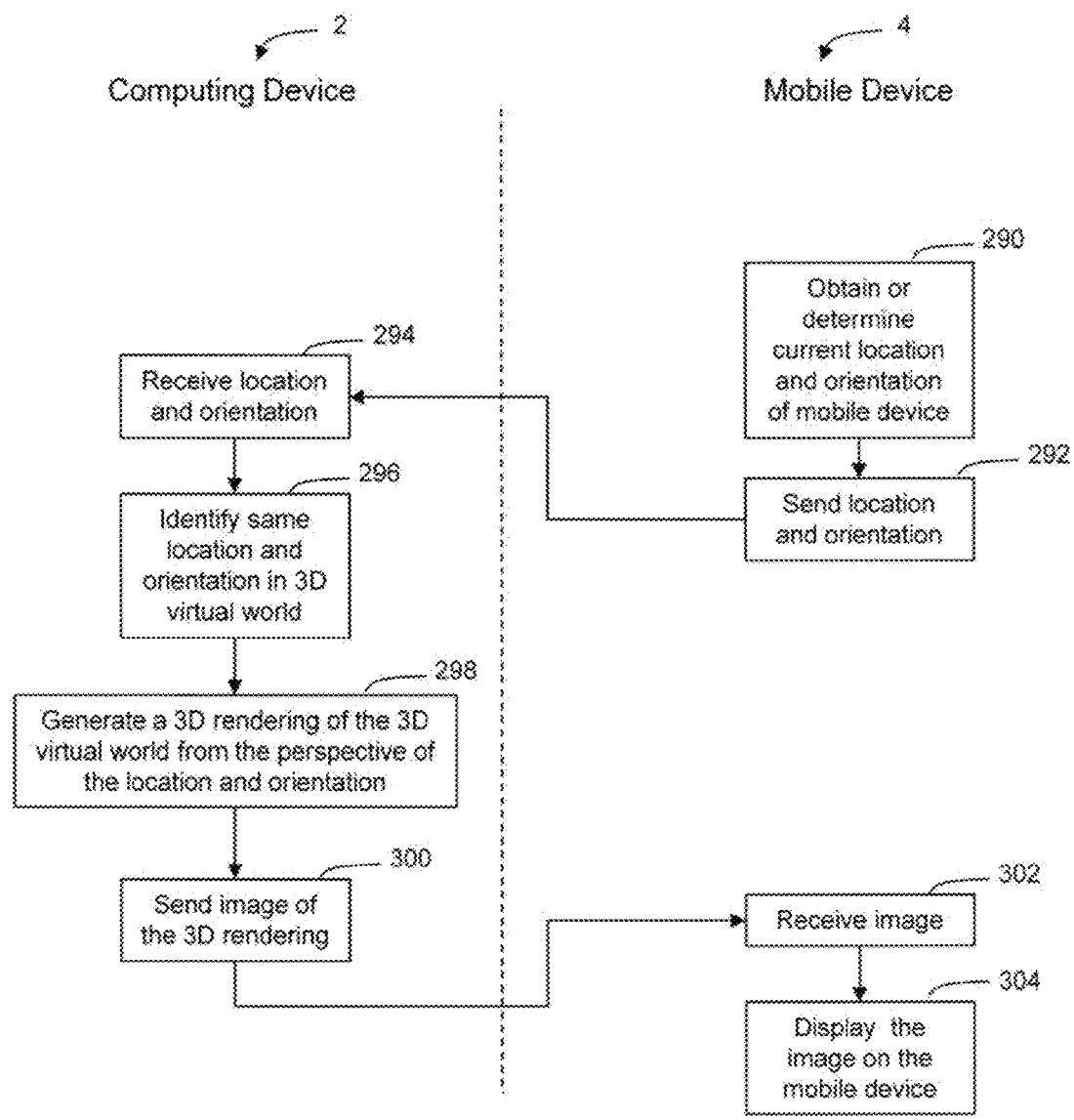
FIG. 23 is a flow diagram of example computer executable operation for displaying an image on a mobile device, the image generated from a 3D virtual world corresponding to the physical environment of the mobile device.

FIG. 23 provides example computer executable instructions for providing an augmented reality experience on the mobile device 4. At block 290, the mobile device's location and orientation in the physical environment are obtained or determined. For example, GPS 24, the inertial sensor 28, the LPS 29, or combinations thereof, can be used to determine the orientation and location of the mobile device 4. Optionally, the location and orientation information can be manually entered.

At block 292, the mobile device 4 sends the location and orientation information to the computing device 2. The computing device 2 receives the location and orientation information (block 294) and then identifies the same location and orientation in the 3D virtual world 296. The computing device 2 then generates a 3D rendered image of the 3D virtual world from the perspective of the location and orientation provided by the mobile device 4 (block 298).

At block 300, the computing device 2 sends the image of the 3D rendering to the mobile device 4 and, upon receipt, the mobile device 4 displays the image.

In another aspect, the proposed systems and methods allow a user of the mobile device 4 to more conveniently identify the location of where to place objects. For example, a technician is given instructions to affix several light fixtures at various locations along a truss. Manually measuring the locations can be difficult. However, by using the location tracking devices (e.g. GPS, LPS, inertial sensors, tracking device or system 5) and by using the visualization of the 3D virtual world 32 provided by the computing device 2, the mobile device 4 is able to display where each light fixture is to be placed on the truss as the mobile device 4 is physically moved along the truss. Such principles also apply to placing or positioning any type of object in the physical or real world.

Figure 24:
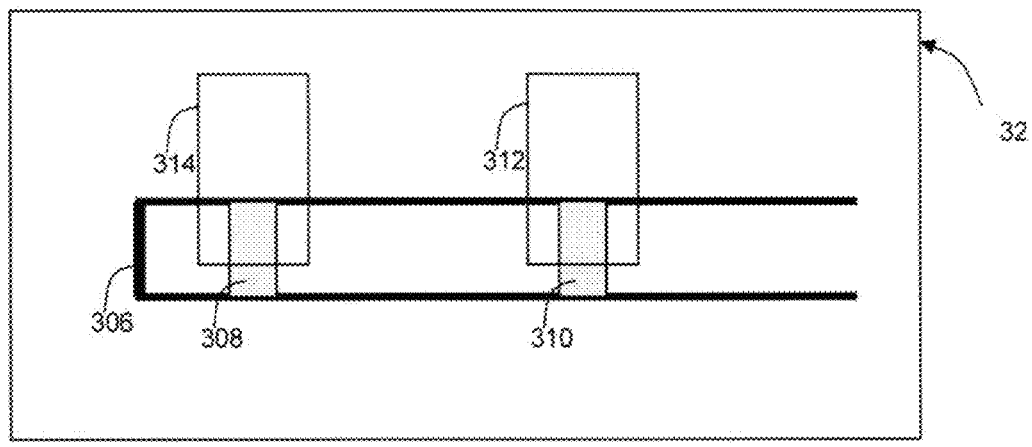
FIG. 24 is a schematic diagram illustrating an example embodiment of a 3D virtual world.

For example, turning to FIG. 24, the 3D virtual world 32 may include a virtual truss 306 having certain location coordinates and dimensions. Attached to the virtual truss 306 along certain positions are virtual brackets 308 and 310 to support virtual lights fixtures 314 and 312, respectively. The location coordinates and dimensions of these virtual objects are specified in the 3D virtual world 32.

Figure 25:
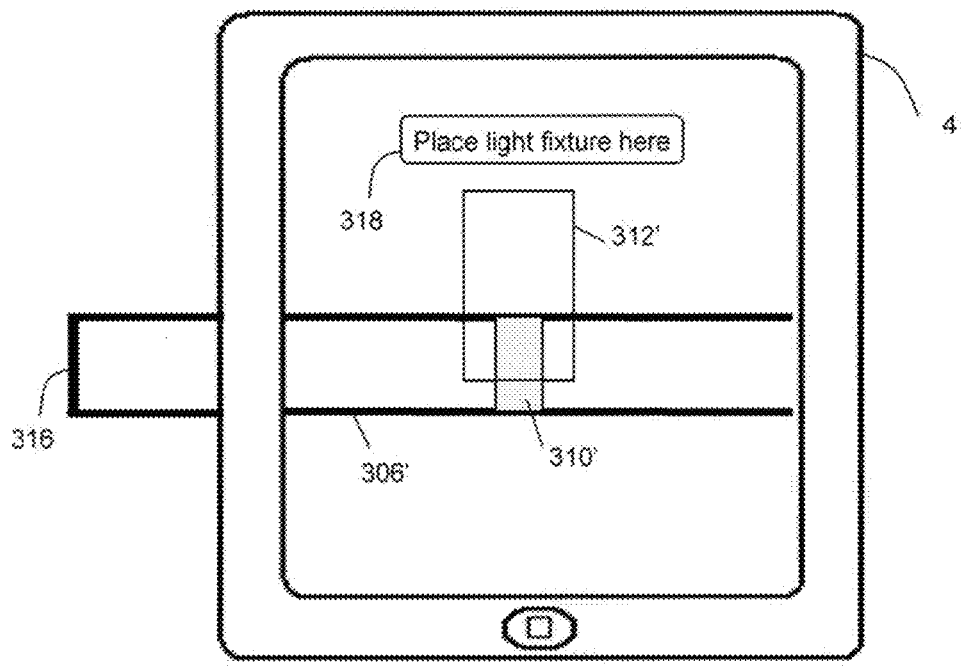
FIG. 25 is a schematic diagram illustrating a mobile device display images according to the example embodiment of the 3D virtual world of FIG. 24.

FIG. 25 shows the physical truss 316 in the real world. The virtual truss 306 corresponds to the physical truss 316. Notably, the physical truss 316 does not have any brackets or light fixtures attached to it. Also in the real world is the mobile device 4. The user uses the mobile device 4 determine where to place the brackets and the light fixtures along the physical truss 316. The mobile device 4 displays images of the virtual objects. For ease of understanding, the images of the virtual objects are denoted by the suffix "'". Therefore, the mobile device 4 displays the following images: truss 306' supporting the bracket 310' and the light fixture 312'. The mobile device 4 may also display an indication or message 318 that the physical light fixture and physical bracket are to be placed "here", where the mobile device 4 is located. In other words, if the mobile device's location corresponds to the location of a virtual object, then the mobile device displays the location of the virtual object. This assists a user or technician to place or position a physical object (from which the virtual object corresponds) according the position determined in the 3D virtual world 32.

Figure 26:
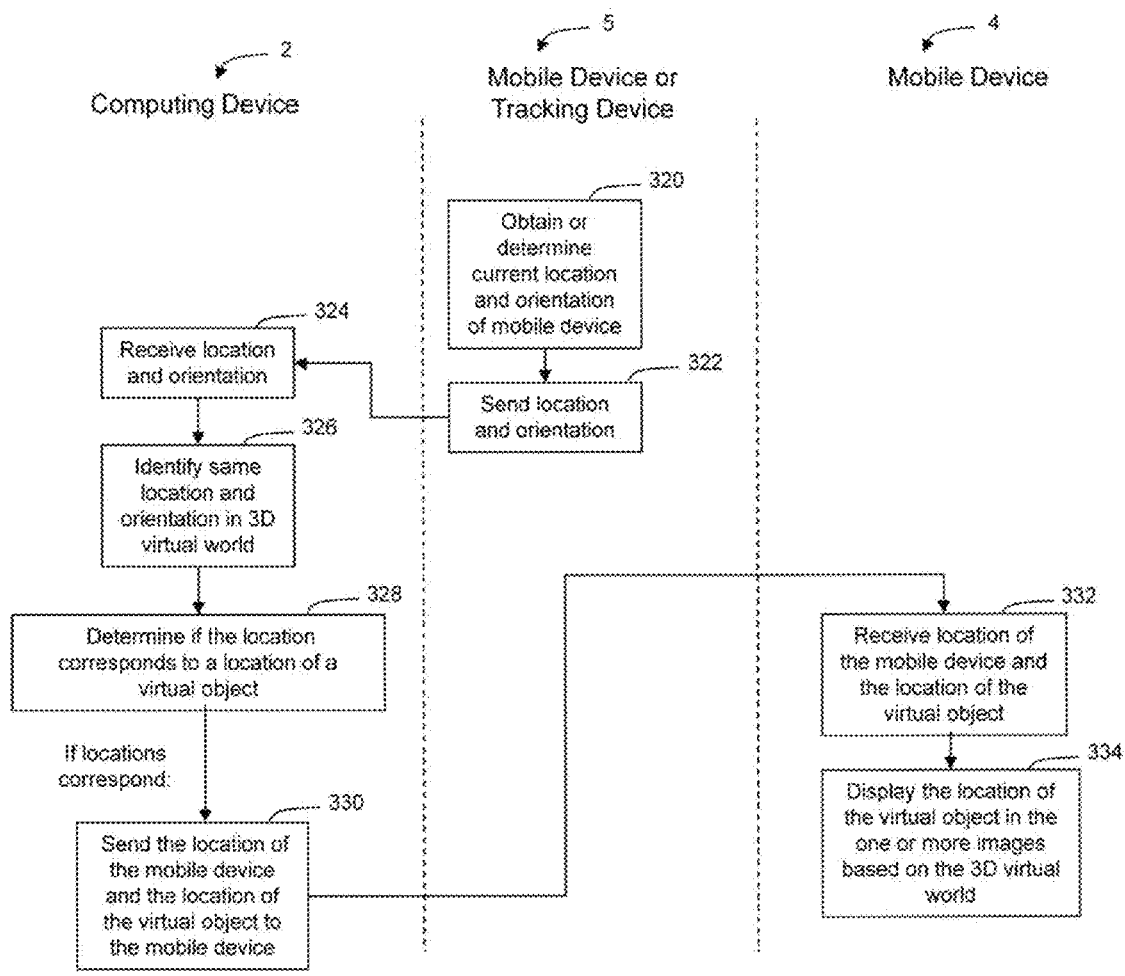
FIG. 26 is a flow diagram of example computer executable operations for displaying an image of the 3D virtual world based on the location of the mobile device.

Turning to FIG. 26, the mobile device 4 or the tracking device or system 5 obtains or determines the current location and the orientation of the mobile device 4 (block 320) and this information is sent to the computing device 2 (block 322). Upon receiving the location and orientation of the mobile device 4 (block 324), the computing device 4 identifies the same location and orientation in 3D virtual world 32 (block 326). The computing device 4 then determines if the location corresponds to a location of a virtual object in the 3D virtual world (block 328), and if so, sends both the location of the mobile device 4 and the location of the virtual object to the mobile device 4 (block 330). Upon receipt (block 330), the mobile device 4 displays the location of the virtual object in the one or more images based on the 3D virtual world 32. It can be appreciated that the one or more images were already provided to the mobile device 4 by the computing device 2.

Figure 27:
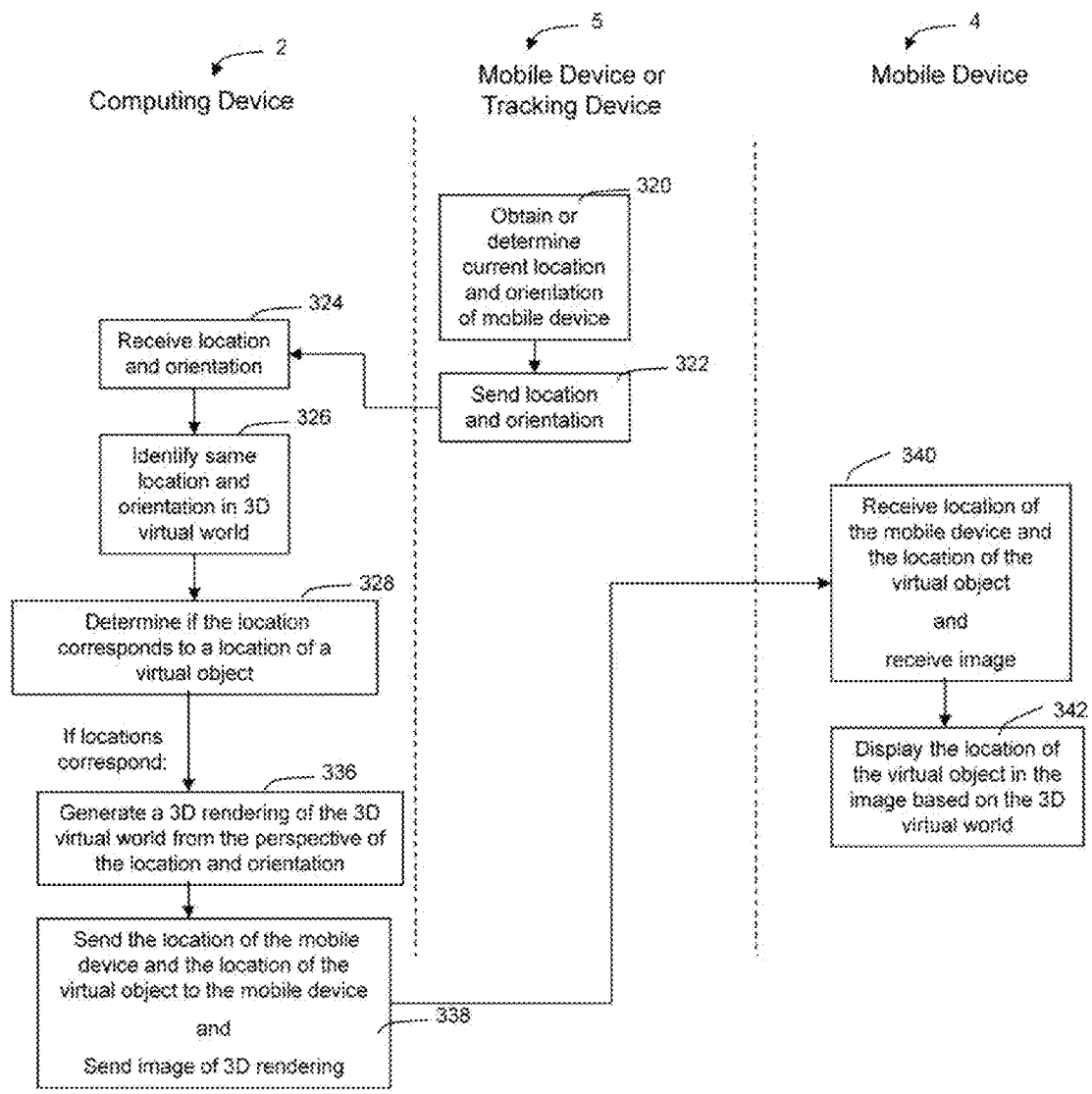
FIG. 27 is a flow diagram of other example computer executable operations for displaying an image of the 3D virtual world based on the location of the mobile device.

However, if the images were not previously provided, then FIG. 27 provides example computer executable instructions in which the location and the images are sent to the mobile device 4. In FIG. 27, blocks 320 to 328 are performed. If the locations of the virtual object and the mobile device 4 correspond, then the computing device 2 generates an image, such as a 2D plot, 3D plot, or 3D rendered image of the 3D virtual world, the images provided from the perspective of the location and orientation of the mobile device 4 (block 336). The computing device then sends the location of the mobile device and the location of the virtual object to the mobile device and sends the image of 3D rendering to the mobile device 4 (block 338). Upon receipt of this information (block 340), the mobile device 4 displays the location of the virtual object in the image based on the 3D virtual world.

Figure 28:
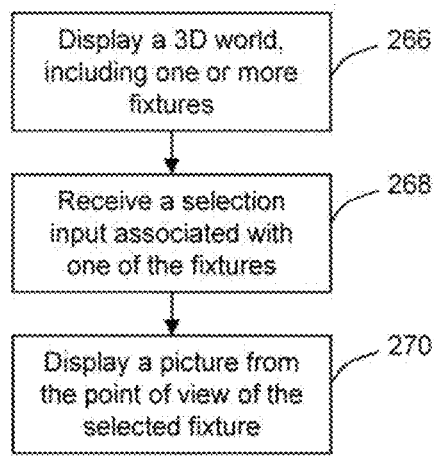
FIG. 28 is a flow diagram of example computer executable operations for displaying a fixture-point-of-view image.

Turning to FIG. 28, example computer executable instructions are provided for displaying a point of view of a fixture on a mobile device 4. At block 266, on a mobile device 4, a static image (e.g. a plot or a look) corresponding to a 3D virtual world is displayed, whereby the image includes one or more fixtures. At block 268, the mobile device 4 receives a selection input from the user associated with one of the fixtures. At block 270, the mobile device 4 displays an image of the 3D virtual world from the point of view of the selected fixture.

Figure 29:
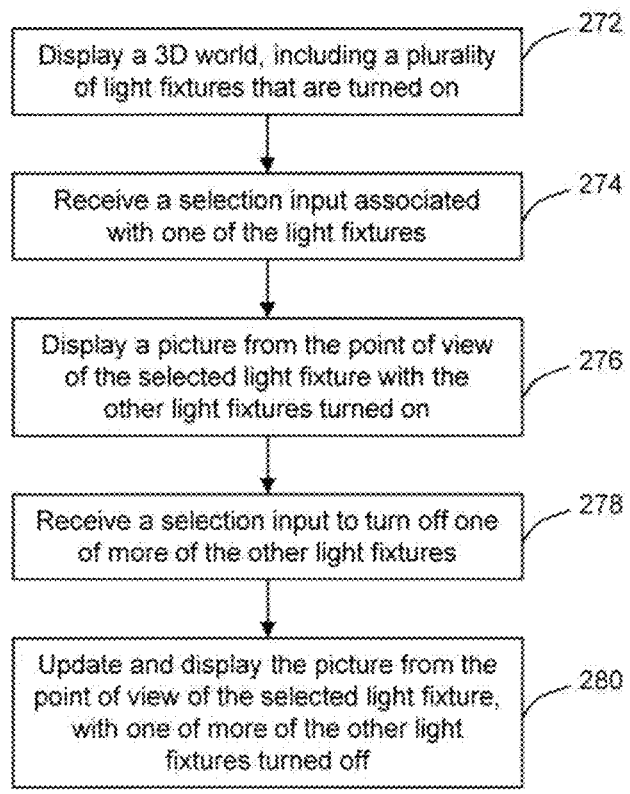
FIG. 29 is a flow diagram of example computer executable operations for displaying a point-of-view image from a light fixture, whereby other light fixtures are also activated.

Turning to FIG. 29, example computer executable instructions are provided for displaying one or more activated virtual light fixtures from the point of view of a certain virtual light fixture. At block 272, on a mobile device 4, a static image of a 3D virtual world is displayed, which includes multiple virtual light fixtures that are turned on or activated. At block 274, the mobile device 4 receives a selection input from the user associated with one of the fixtures. At block 276, the mobile device 4 displays an image of the 3D virtual world from the point of view of the selected fixture, whereby the other light fixtures are turned on. In other words, the light beams from the other light fixtures are displayed in the image from the point of view of the selected fixture. At block 278, the mobile device 4 receives a selection input to turn off or deactivate one or more of the other light fixtures. At block 280, the mobile device 4 displays an updated image from the point of view of the selected light fixture, in which one or more of the other light fixtures are turned off. It can be appreciated that the updated image may be generated on the computing device 2, based on the 3D visual rendering of the 3D virtual world. It can also be understood that the updated image may be sent from the computing device 2 to the mobile device 4.

It can be appreciated that designing a 3D virtual world on a computing device 2, and then generating an image (e.g. a static image) to send to a mobile device 4 has several perceived benefits. A mobile device 4 is able to display the image using a relatively low amount of computing resources, since 3D rendering and management of the 3D virtual world takes place on the computing device 2. The computing device 2 may be larger and may have a relatively large amount of computing resources to allow a designer to plan and design a 3D virtual world. It can therefore be understood that a technician may use a mobile device 4 to view images and information related to objects in the virtual world in a convenient manner. This allows a technician to retrieve information, such as visual and text information, while moving around the real-world or physical environment to set up or arrange objects (e.g. fixtures) according to the design and plan created in the 3D virtual world.

For example, the technician may be located high above the ground, near an elevated truss, in order to set up or adjust a light fixture. The technician may then use the mobile device 4 to view a plot image 40, a look 42 or an image from the light fixture's point of view 44, as well as additional information associated with the light fixture, that would assist the technician in adjusting or setting up the light fixture. Therefore, the technician may conveniently retrieve images and information to set up the light fixture, even while located in difficult-to-access areas. It can be appreciated that multiple technicians may work together, each using a mobile device 4 according the principles described herein, to set up multiple light fixtures.

Another perceived benefit of the computing device 2 and the mobile device 4 is that a designer and technician may communicate more effectively and efficiently with another, while having the ability to be located in separate places. For example, a technician may be located in the real-world or physical environment to set up or arrange the objects in accordance with the designer's plan (e.g. 3D virtual world). The designer may located in another location and may use the computing device 2 to communicate with the technician through the mobile device 4. The designer, using the computing device 2, can send images and information to the technician's mobile device 4. Similarly, the technician can use the mobile device 4 to send feedback to the designer, such as photographs of the real-world or physical environment.

Another perceived benefit is providing to the mobile device 4 an image of a 3D virtual world from the point of view a virtual fixture. The technician can use the image as a guide to set up the real-world fixture.

The steps or operations in the flow charts described herein are just for example. There may be many variations to these steps or operations without departing from the spirit of the invention. For instance, the steps may be performed in a differing order, or steps may be added, deleted, or modified.

The displays or screens described herein are just for example. There may be many variations to the configuration and arrangement of information and user interface controls without departing from the spirit of the invention. For instance, the information and the user interface controls may be in a differing order, or may be added, deleted, or modified.

The principles described herein may be used in security applications. For example, a designer may design an environment with a number of security fences, camera fixtures, and light fixtures. A technician may use the mobile device 4 to retrieve images and information to arrange and adjust the security fences, camera fixtures, and light fixtures, whereby the images and information are based on the 3D virtual world designed by the designer. The principles described herein may also apply to weapon fixtures, such as laser fixtures, gun fixtures, projectile fixtures, etc., and may apply more generally to fixtures having a line-of-sight.

Other example applications may include traffic monitoring, packing trucks, loading shelves, and designing stores and layouts. The principles described herein may also apply to situations where a designer plans or designs a physical space comprising one or more real-world objects. It can be appreciated that from the above examples, the principles described herein may also apply in various other physical environments.

Although the above has been described with reference to certain specific embodiments, various modifications thereof will be apparent to those skilled in the art as outlined in the appended claims.

The invention claimed is:

1. A computing device used for visualizing virtual objects on a mobile device, the computing device in communication with the mobile device, the computing device comprising a processor, memory and a communication device, the computing device configured to execute at least the following instructions:
    obtaining a 3D virtual world of one or more virtual objects corresponding to one or
    more physical objects in a real world, the one more virtual objects including a virtual fixture corresponding to a physical fixture;
    associating operational attributes of the physical fixture with the virtual fixture;
    generating a 2D or 3D image based on the 3D virtual world, the 2D or 3D image displaying the virtual fixture;
    sending the 2D or 3D image, the operational attributes, and a name of the virtual fixture to the mobile device;
    receiving the name of the virtual fixture from the mobile device;
    obtaining a static image of the 3D virtual world from a point of view of the named virtual fixture; and
    sending the static image to the mobile device;
    wherein the 2D or 3D image is configured to be displayed on the mobile device and the operational attributes are configured to be displayed on the mobile device in association with the virtual fixture, and the operational attributes further comprising at least one of power draw of the physical fixture and a data channel for the physical fixture.

2. The computing device of claim 1 wherein the computing device is also configured to execute the following instructions:
    after receiving a location of the mobile device, the computing device determining a location of a virtual fixture located closest to the location of the mobile device in the 3D virtual word;
    obtaining a static image of the point of view of the closest virtual fixture; and
    sending the static image to the mobile device.

3. The computing device of claim 1 wherein the computing device is also configured to execute the following instructions:
    after receiving a location and an orientation of the mobile device, identifying a corresponding location and a corresponding orientation in the 3D virtual world;
    obtaining a static image of the 3D virtual world from a point of view from the corresponding location and the corresponding orientation; and
    sending the static image to the mobile device.

4. The computing device of claim 1 wherein the computing device is also configured to execute the following instructions:
    after receiving a photograph from the mobile device, displaying in a graphical user interface (GUI) the photograph and the static image from the point of view of the virtual fixture; and
    receiving through the GUI a user input that determines a result indicating whether or not the photograph matches the static image.

5. The computing device of claim 1 wherein the virtual fixture is any one of a camera and a light.

6. The computing device of claim 1 wherein the operational attributes further comprise orientation of the physical fixture.

7. A method performed by a computing device for visualizing virtual objects on a mobile device, the method comprising:
    obtaining a 3D virtual world of one or more virtual objects corresponding to one or more physical objects in a real world, the one more virtual objects including a virtual fixture corresponding to a physical fixture;
    associating operational attributes of the physical fixture with the virtual fixture;
    generating a 2D or 3D image based on the 3D virtual world, the 2D or 3D image displaying the virtual fixture;
    sending the 2D or 3D image, the operational attributes, and a name of the virtual fixture to the mobile device;
    receiving the name of the virtual fixture from the mobile device;
    obtaining a static image of the 3D virtual world from a point of view of the named virtual fixture; and
    sending the static image to the mobile device;
    wherein the 2D or 3D image is configured to be displayed on the mobile device and the operational attributes are configured to be displayed on the mobile device in association with the virtual fixture, the operational attributes comprising at least one of power draw of the physical fixture and the data channel for the physical fixture.

8. The method of claim 7 further comprising:
    the computing device, after receiving a location of the mobile device, determining a location of a virtual fixture located closest to the location of the mobile device in the 3D virtual word;
    obtaining a static image of the point of view of the closest virtual fixture; and
    sending the static image to the mobile device.

9. The method of claim 7 further comprising:
    the computing device, after receiving a location and an orientation of the mobile device, identifying a corresponding location and a corresponding orientation in the 3D virtual world;
    obtaining a static image of the 3D virtual world from a point of view from the corresponding location and the corresponding orientation; and
    sending the static image of the 3D virtual world to the mobile device.

10. The method of claim 7 wherein the method further comprises:
    the computing device, after receiving a photograph from the mobile device, displaying in a graphical user interface (GUI) the photograph and the static image from the point of view of the virtual fixture; and receiving through the GUI a user input that determines a result indicating whether or not the photograph matches the static image.

11. The method of claim 7 wherein the virtual fixture is any one of a camera and a light.

12. The method of claim 7 wherein the operational attributes further comprise orientation of the physical fixture.

\* \* \* \* \*